US010555368B2

(12) United States Patent
Gustafsson et al.

(10) Patent No.: US 10,555,368 B2
(45) Date of Patent: Feb. 4, 2020

(54) ACTIVE PERIOD OF A DISCONTINUOUS RECEPTION CYCLE

(71) Applicant: Telefonaktiebolaget LM Ericsson (publ), Stockholm (SE)

(72) Inventors: Christer Gustafsson, Huddinge (SE); Anders Ohlsson, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/777,287

(22) PCT Filed: Nov. 19, 2015

(86) PCT No.: PCT/EP2015/077111
§ 371 (c)(1),
(2) Date: May 18, 2018

(87) PCT Pub. No.: WO2017/084712
PCT Pub. Date: May 26, 2017

(65) Prior Publication Data
US 2018/0338344 A1    Nov. 22, 2018

(51) Int. Cl.
*H04W 76/28*   (2018.01)
*H04W 52/02*   (2009.01)
*H04W 72/12*   (2009.01)
*H04L 1/18*    (2006.01)
*H04L 5/00*    (2006.01)
*H04W 72/14*   (2009.01)

(52) U.S. Cl.
CPC ........... *H04W 76/28* (2018.02); *H04L 1/1812* (2013.01); *H04L 5/0055* (2013.01); *H04W 52/0216* (2013.01); *H04W 72/1289* (2013.01); *H04W 72/14* (2013.01)

(58) Field of Classification Search
None
See application file for complete search history.

(56) References Cited

U.S. PATENT DOCUMENTS

2010/0290509 A1* 11/2010 Dalsgaard ............. H04W 76/28
375/220

FOREIGN PATENT DOCUMENTS

WO    WO 2015/028054 A1    3/2015

OTHER PUBLICATIONS

3GPP TS 46.081 V10.0.0, "3rd Generation Partnership Project; Technical Specification Group Services and System Aspects; Discontinuous Transmission (DTX) for Enhanced Full Rate (EFR) speech traffic channels (Release 10)," 13 pages, Mar. 2011.
Notification of Transmittal of the International Search Report and the Written Opinion of the International Searching Authority, or the Declaration for International Application No. PCT/EP2015/077111 dated Jul. 25, 2016.

* cited by examiner

*Primary Examiner* — Diane L Lo
(74) *Attorney, Agent, or Firm* — Sage Patent Group

(57) ABSTRACT

A first message is transmitted via a radio link of a cellular network to a terminal. The first message triggers the terminal to transmit a second message via the radio link at the associated transmission interval. The radio link is monitored for reception of the second message at the associated transmission interval. Based on said monitoring, the duration of an active period of the discontinuous reception cycle to be implemented by the terminal is determined.

18 Claims, 14 Drawing Sheets

ACTIVE PERIOD OF A DISCONTINUOUS RECEPTION CYCLE

CROSS REFERENCE TO RELATED APPLICATION

This application is a 35 U.S.C. § 371 national stage application of PCT International Application No. PCT/EP2015/077111, filed on Nov. 19, 2015, the disclosure and content of which is incorporated by reference herein in its entirety.

TECHNICAL FIELD

Various embodiments relate to determining a duration of an active period of a discontinuous reception cycle to be implemented by a terminal and to a corresponding network node of a cellular network. In particular, various embodiments relate to techniques of determining the duration of the active period based on monitoring a radio link of the cellular network for reception of a previously triggered message.

BACKGROUND

Mobile communication for cellular networks is an integral part of modern life. With more and more terminals connecting to cellular networks, reducing power consumption of the terminals is a major requirement.

Techniques are known to reduce power consumption of a terminal by implementing discontinuous reception of messages transmitted by the cellular network via a radio link of the cellular network. One example of implementing discontinuous reception is the Discontinuous Reception Cycle (DRX) according to the Third Generation Partnership Project (3GPP) Technical Specification (TS) 36.321 V12.7.0 (2015-09). Here, a terminal in idle state discontinuously monitors the Physical Downlink Control Channel (PDCCH) according to the 3GPP Long Term Evolution (LTE) Evolved Universal Terrestrial Radio Access (E-UTRA) radio access technology (RAT), see, e.g., 3GPP TS 36.211 V12.7.0 (2015-09). The PDCCH is utilized for transmission of control data via the radio link. In particular, a cycle of the DRX comprises an On_Duration (active period) and an inactive period. The terminal selectively listens for downlink control data during the active period; during the inactive period, a protocol stack implemented for receiving data and/or an analog front end and/or a digital front end of the terminal are at least partially powered down to reduce power consumption.

However, such techniques face certain restrictions and drawbacks. Because reception of control data is restricted to the active period, such a protocol is vulnerable to missed detection of control data communicated on the PDCCH. In particular, where the control data comprises PDCCH commands such as downlink (DL) assignments or uplink (UL) grants specifying resources for communicating payload data via the radio link, successful transmission of the payload data can be considerably delayed.

In particular, where the payload data is associated with a service implemented by the cellular network and the terminal, the service having a quality of service (QoS) requirement corresponding to a certain latency, it can be difficult to fulfill this QoS requirement. E.g., the latency of communicating the payload data may be influenced by a periodicity of the DRX. E.g., where communication of control data comprising a PDCCH command has failed, sometimes it may be required to postpone retransmission of the PDCCH command to the next active period of the DRX.

SUMMARY

Accordingly, there is a need for techniques of controlling implementation of a discontinuous reception cycle in a flexible, easy, and accurate way. In particular, there is a need for techniques which enable controlling implementation of a discontinuous reception cycle for services having a comparably strict QoS requirement corresponding to latency and, in turn, adapt power consumption of the terminal in line with the implemented discontinuous reception cycle.

This need is met by the features of the independent claims. The dependent claims define further embodiments.

According to some embodiments, a method is provided. The method comprises transmitting, via a radio link of a cellular network and to a terminal, a first message. The first message triggers the terminal to transmit a second message via the radio link at an associated transmission interval. The method further comprises monitoring the radio link for reception of the second message at the associated transmission interval. The method further comprises, based on said monitoring, determining a duration of an active period of a discontinuous reception cycle to be implemented by the terminal.

According to some embodiments, a method is provided. The method comprises a network node transmitting, via a radio link of a cellular network and to a terminal, a first message. The first message triggers the terminal to transmit a second message via the radio link at an associated transmission interval. The method further comprises the terminal, during an active period a discontinuous reception cycle having a first duration, monitoring the radio link for reception of the first message. The method further comprises the terminal, in response to receiving the first message, transmitting the second message at the associated transmission interval. The second message is transmitted via the radio link and to the network node. The method further comprises the network node monitoring the radio link for reception of the second message at the associated transmission interval. The method further comprises determining a second duration of the active period of the discontinuous reception cycle to be implemented by the terminal, based on said monitoring of the radio link for reception of the second message.

According to some embodiments, a network node of a cellular network is provided. The network node comprises a memory configured to store instructions executable by at least one processor. The at least one processor is configured to execute the instructions to perform: transmitting, via a radio link of a cellular network and to a terminal, a first message, the first message triggering the terminal to transmit a second message via the radio link at an associated transmission interval; monitoring the radio link for reception of the second message at the associated transmission interval; and based on said monitoring the radio link for reception of the second message, determining a duration of an active period of a discontinuous reception cycle to be implemented by the terminal.

According to some embodiments, a system is provided. The system comprises a network node and a terminal. The network node comprises a memory configured to store first instructions executable by at least one processor. The network node further comprises the at least one processor configured to execute the first instructions to perform:

transmitting a first message via a radio link of the cellular network to the terminal. The first message triggers the terminal to transmit a second message at an associated transmission interval via the radio link and to the network node. The terminal comprises a memory configured to store second instructions executable by at least one processor. The terminal further comprises the at least one processor configured to execute the second instructions to perform monitoring the radio link for reception of the first message during an active period of a discontinuous reception cycle. The active period has a first duration. The at least one processor of the terminal is further configured to execute the second instructions to perform transmitting the second message at the associated transmission interval in response to receiving the first message. The second message is transmitted via the radio link and to the network node. The at least one processor of the network node is further configured to execute the first instructions to perform: monitoring the radio link for reception of the second message at the associated transmission interval; and, based on said monitoring of the radio link for reception of the second message, determining a second duration of the active period of the discontinuous reception cycle to be implemented by the terminal.

According to various embodiments, a computer program product is provided. The computer program product comprises instructions which can be executed by at least one processor. Executing the instructions causes the at least one processor to perform a method. The method comprises transmitting, via a radio link of a cellular network and to a terminal, a first message. The first message triggers the terminal to transmit a second message via the radio link at an associated transmission interval. The method further comprises monitoring the radio link for reception of the second message at the associated transmission interval. The method further comprises, based on said monitoring, determining a duration of an active period of a discontinuous reception cycle to be implemented by the terminal.

According to various embodiments, a computer readable storage medium, having stored thereon a computer program, is provided. Execution of the computer program by at least one processor causes the at least one processor to execute a method. The method comprises transmitting, via a radio link of a cellular network and to a terminal, a first message. The first message triggers the terminal to transmit a second message via the radio link at an associated transmission interval. The method further comprises monitoring the radio link for reception of the second message at the associated transmission interval. The method further comprises, based on said monitoring, determining a duration of an active period of a discontinuous reception cycle to be implemented by the terminal.

According to various embodiments, a network node is provided. The network node comprises a module for transmitting, via a radio link of a cellular network and to a terminal, a first message. The first message triggers the terminal to transmit a second message via the radio link at an associated transmission interval. The network node further comprises a module for monitoring the radio link for reception of the second message at the associated transmission interval. The network node further comprises a module for determining a duration of an active period of a discontinuous reception cycle to be implemented by the terminal based on said monitoring.

According to various embodiments, a computer program product is provided. The computer program product comprises instructions which can be executed by at least one processor. Executing the instructions causes the at least one processor to perform a method. The method comprises a network node transmitting, via a radio link of a cellular network and to a terminal, a first message. The first message triggers the terminal to transmit a second message via the radio link at an associated transmission interval. The method further comprises the terminal, during an active period a discontinuous reception cycle having a first duration, monitoring the radio link for reception of the first message. The method further comprises the terminal, in response to receiving the first message, transmitting the second message at the associated transmission interval. The second message is transmitted via the radio link and to the network node. The method further comprises the network node monitoring the radio link for reception of the second message at the associated transmission interval. The method further comprises determining a second duration of the active period of the discontinuous reception cycle to be implemented by the terminal, based on said monitoring of the radio link for reception of the second message.

According to various embodiments, a computer readable storage medium, having stored thereon a computer program, is provided. Execution of the computer program by at least one processor causes the at least one processor to execute a method. The method comprises a network node transmitting, via a radio link of a cellular network and to a terminal, a first message. The first message triggers the terminal to transmit a second message via the radio link at an associated transmission interval. The method further comprises the terminal, during an active period a discontinuous reception cycle having a first duration, monitoring the radio link for reception of the first message. The method further comprises the terminal, in response to receiving the first message, transmitting the second message at the associated transmission interval. The second message is transmitted via the radio link and to the network node. The method further comprises the network node monitoring the radio link for reception of the second message at the associated transmission interval. The method further comprises determining a second duration of the active period of the discontinuous reception cycle to be implemented by the terminal, based on said monitoring of the radio link for reception of the second message.

It is to be understood that the features mentioned above and those yet to be explained below may be used not only in the respective combinations indicated, but also in other combinations or in isolation without departing from the scope of the invention.

BRIEF DESCRIPTION OF THE DRAWINGS

The foregoing and additional features and effects of the invention will become apparent from the following detailed description when read in conjunction with the accompanying drawings.

DETAILED DESCRIPTION OF EMBODIMENTS

Figure 1:
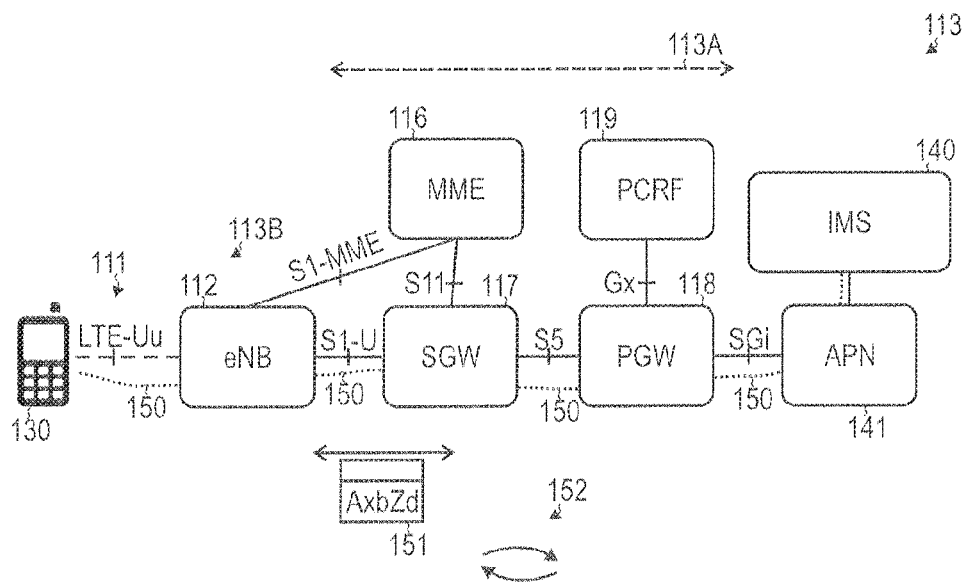
FIG. 1 schematically illustrates a cellular network to which a terminal is connected via a radio link, wherein the cellular network and the terminal implement a service, wherein the service has a QoS requirement corresponding to latency.

In the following, concepts in accordance with exemplary embodiments of the invention will be explained in greater detail and with reference to the accompanying drawings. The illustrated embodiments relate to techniques of controlling implementation of a discontinuous reception cycle and, in particular, to determining the duration of an active period of a discontinuous reception cycle, the determined duration being for implementation by a terminal connected to a cellular network.

In the illustrated examples, monitoring a radio link between the cellular network and the terminal for reception of a second message, which is triggered by a first message previously transmitted to the terminal, is used as a decision criterion for said determining of the duration of the active period. In particular, the first message triggers the terminal to transmit the second message at an associated transmission interval.

In some examples, the radio link is monitored for failed reception of the second message. Sometimes, a situation where the first message has been transmitted, but the second message is not received is referred to as a discontinuous transmission (DTX) event. As a DTX event, typically those events are treated in which an access node of the radio link expects some transmission from the terminal, and vice versa, but no signal is detected over the air. There may be various reasons for a DTX event. One reason for DTX events may be noise present on the radio link.

In some examples, an increased number of DTX events may lead to determining a prolonged duration of the active period of the discontinuous reception cycle, thereby decreasing a likelihood of future DTX events. Thereby, communication of payload data via the radio link may be facilitated.

In some examples, the first message may comprise a PDCCH command. E.g., the first message may specify resources on a DL payload channel or may allocate resources on an UL payload channel, i.e., may correspond to a DL assignment or an UL grant. Here, DTX events can lead to failure in the communication of DL payload data or UL payload data, respectively. In particular, the DTX events can lead to an increased latency for the communication of the DL payload data or the UL payload data, respectively. By determining the duration of the active period of the discontinuous reception cycle to be implemented by the terminal according to the various techniques disclosed herein, it is possible to reduce the latency for the communication of the DL payload data or the UL payload data, respectively. In particular, for services implemented by the terminal and the cellular network which have a demanding QoS requirement corresponding to latency, such an determining of the duration of the active period of the discontinuous reception cycle can help to meet the QoS requirement.

In some examples, communication of the DL payload data and/or the UL payload data may be protected by an Automatic Repeat Request (ARQ) protocol that may be implemented, e.g., by a Media Access Control (MAC) layer of a corresponding protocol stack utilized for transmission via the radio link. Various techniques disclosed herein are based on the finding that a relative dimensioning of certain parameters of the ARQ protocol with respect to the duration of the active period of the discontinuous reception cycle can significantly reduce a likelihood of a DTX event. Thereby, by appropriately setting the duration of the active period of the discontinuous reception cycle relative to the certain parameters of the ARQ protocol, a reduced latency in communication of the DL payload data and/or the UL payload data may be achieved. One specific example of a respective parameter of the ARQ protocol—which may show interdependencies with the duration of the active period of the discontinuous reception cycle—is a retransmission timer value. The retransmission timer value may specify the time period between subsequent retransmission attempts of ARQ-protected payload data. The retransmission timer may alternatively or additionally specify the time period between subsequent retransmission attempts of UL grants of DL assignments.

FIG. 1 schematically illustrates an architecture of a cellular network 113 which may be used for implementing the concepts as outlined above. FIG. 1 is an example disclosed in the context of the 3GPP LTE protocol for illustrative purposes only. Similar techniques as disclosed herein can be readily applied to various kinds of 3GPP-specified networks, such as Global Systems for Mobile Communications (GSM), Wideband Code Division Multiplex (WCDMA), General Packet Radio Service (GPRS), Enhanced Data Rates for GSM Evolution (EDGE), Enhanced GPRS (EG-PRS), Universal Mobile Telecommunications System (UMTS), and High Speed Packet Access (HSPA). Similar techniques may be applied to Machine Type Communication (MTC) or upcoming 3GPP 5G technology. However, operation of the network is not limited to the scenario of a cellular network or a 3GPP-specified network. E.g., at least parts of the radio link(s) of the wireless network could be operated according to the Wireless Local Area Network (WLAN or Wi-Fi) RAT, Bluetooth, Near Field Communication, or satellite communication.

In FIG. 1, the terminal 130 is connected via E-UTRA RAT 113B implemented by an access node in the form of an evolved node B (eNB) 112. The eNB 112 and the terminal 130 communicate using packetized traffic via a radio link 111. Various channels may be implemented on the radio link 111 for utilizing transmission via the radio link 111. Such channels be referred to as logical channels. The channels may comprise dedicated time-frequency resource blocks on the radio link 111. The channels may include the PDCCH implementing a DL control channel, the Physical Uplink Control Channel (PUCCH) implementing an UL control channel, the Physical DL Shared Channel (PDSCH) implementing a DL payload channel, and the Physical UL Shared Channel (PUSCH) implementing a UL payload channel. The channels may also include the Physical Hybrid Automatic Repeat Request Indicator Channel (PHICH).

In FIG. 1, the terminal 130 is connected to a packet data network (PDN) 140 via a bearer 150 and an access node 141. The PDN 140 may offer a service 151 such Voice over LTE (VoLTE) to the terminal 130. The PDN 140 may implement an IP Multimedia Subsystem (IMS).

Hereinafter, various examples are disclosed for the VoLTE service 151. However, other services and PDNs can be subject to the techniques as described herein, e.g., the Internet.

The terminal 130 and the cellular network 113 implement the VoLTE service 151: Payload data of the VoLTE service 151 is communicated on the bearer 150. E.g., the bearer 150 (illustrated by the dotted line in FIG. 1) may be implemented by a plurality of adjacent sub-bearers and/or secure tunnels facilitating communication of the payload data. E.g., the bearer 150 may be identified by an Internet Protocol (IP) address of the terminal 130 assigned by the cellular network 113 to the terminal 130. E.g., the bearer 150 may be identified by a bearer identification (bearer ID).

The payload data may relate to data used by higher layers of a protocol stack with respect to the VoLTE service 151. The payload data may be user-specific for a subscriber of the cellular network 113 associated with the terminal 130 and/or the s VoLTE service 151. E.g., for the VoLTE service 151, the payload data may correspond to voice packets that are typically generated at a certain periodicity, e.g., 20 ms.

The VoLTE service 151 has a certain QoS requirement. E.g., the QoS requirement of the VoLTE service 151 may be specified by a QoS class identifier (QCI) associated with the bearer 150, see, e.g., 3GPP TS 23.203 V13.5.1 (2015-09). The QoS requirement, in particular, relates to a latency 152. E.g., the latency may be specified in-between certain layers of the protocol stack. E.g., the latency may correspond to a delay between requesting data associated with the service and receiving the data. E.g., the latency may correspond to a mouth-to-ear delay for voice-related services such as the VoLTE service 151. Sometimes, the latency may be specified in terms of a packet delay budget. Further QoS requirements may relate to traffic throughput, a priority, etc.

FIG. 1 further schematically illustrates the evolved packet system (EPS) architecture of the LTE protocol. The EPS comprises an evolved packet core (EPC) as core network 113A and the E-UTRA 113B. The bearer 150 is between the terminal 130, the eNB 112, the EPC 113A, and further the PDN 140. Various sub-bearers 150 can connect these different instances.

The reference point implemented by the radio link 111 between the terminal 130 and the eNB 112 operates according to the LTE-uU protocol. The bearer 150 may pass along the radio link 111.

The eNB 112 is connected to a gateway node implemented by for example a Serving Gateway (SGW) 117. As such, the SGW 117 may route and forward data packets of the data transmission 150 and may act as a mobility anchor of the user plane during handovers of the terminal 130 between different cells of the cellular network 113. The reference point between the eNB 112 and the SGW 117 operates according to the S1-U protocol.

The SGW 117 is connected via a reference point operating according to the S5 protocol to a further gateway node implemented by, e.g., a Packet Data Network Gateway (PGW) 118. The PGW 118 serves as a point of exit and point of entry of the cellular network 113 for data packets of the bearer 150 towards the PDN 140. As such, the PGW is connected with the access node 141 of the PDN 140 via a reference point operating according to the SGi protocol.

Access functionalities of the terminal 130 to the PDN 140, e.g., access functionality to the bearer 150, may be controlled by a control node implemented by a Mobility Management Entity (MME) 116. The MME 116 is connected via a reference point operating according to the S1-MME protocol with the access node 112. Further, the MME 116 is connected via a reference point operating according to the S11 protocol with the SGW 117. E.g., the MME 116 may check whether the subscriber associated with the terminal 130 is authorized to establish the bearer 150 by accessing the access node 141.

Policy and charging functionality of the bearer 150 is controlled by a control node 119 implemented for example by a Policy and Charging Rules Function (PCRF) 119. The PCRF 119 is connected via a reference point operating according to the Gx protocol with the PGW 118. The PGW 118 may implement a Policy and Charging Policy and Charging Enforcement Function (PCEF) which is controlled by Policy and Charging Control (PCC) rules provided by the PCRF 119 via the Gx protocol.

Figure 2A:
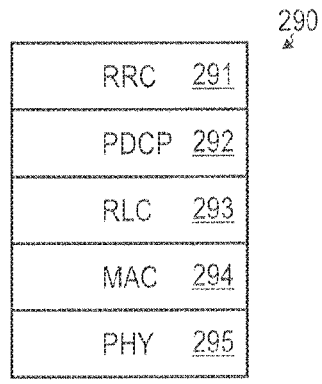
FIG. 2A schematically illustrates a protocol stack implemented by an access node of the cellular network and by the terminal according to various embodiments, the protocol stack being for communication on channels utilized for transmission via the radio link.

FIG. 2A illustrates aspects with respect to a protocol stack 290 implemented by the terminal 130 and the eNB 112 for communicating on the various channels utilized for transmission on the radio link 111.

The Radio Resource Control (RRC) layer 291 handles broadcast of System Information relating to non-access stratum and access stratum, paging of terminals, handling of RRC connections between the terminal 130 and the E-UTRAN 113B, etc. The Packet Data Convergence Protocol (PDCP) layer handles header compression/decompression, transferring of payload data, in-sequence delivery of upper-layer protocol data units (PDUs). Further, the QoS requirements of the VoLTE service 151 relating to latency can be defined as inter-PDCP delay. The Radio Link Control (RLC) layer 293 is in charge of segmenting and concatenating RLC service data units (SDUs) received from the PDCP layer 292 into RLC PDUs and deliver them to the Medium Access (MAC) layer 294. The degree of segmentation/concatenation and hence the size of the RLC PDUs depends on the scheduler decisions that take into account the type of traffic and the actual channel conditions. The RLC PDU is then multiplexed into a MAC PDU together with a MAC header, possibly with RLC PDU segments from the same or other channels, and optionally with MAC Control Elements (MAC CE) and padding to match the size of certain transmission intervals. Eventually the transmission intervals are mapped into a certain Hybrid ARQ (HARQ) process and transmitted over the air, i.e., via the radio link 111, by means of the physical (PHY) layer 295. The HARQ processes combined an ARQ protocol with Forward Error Correction (FEC) encoding techniques.

Figure 2B:
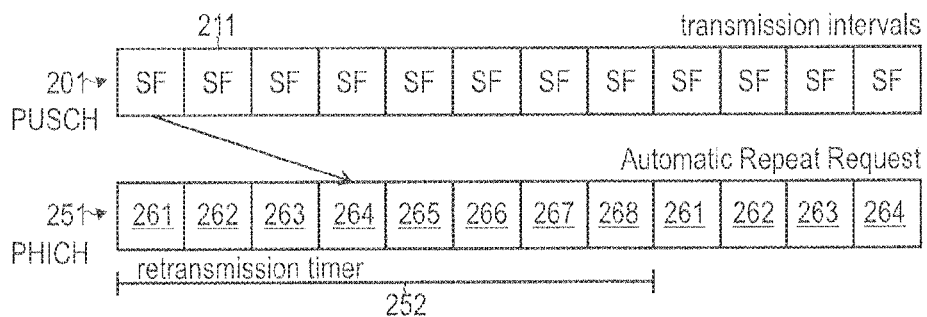
FIG. 2B schematically illustrates transmission intervals of a channel utilized for transmission of payload data via the radio link and further schematically illustrates an Automatic Repeat Request protocol implemented by a Media Access Control layer of the protocol stack utilized for transmission via the radio link and protecting the transmission of the payload data.

FIG. 2B illustrates aspects with respect to the 3GPP LTE transmission intervals 211, sometimes referred subframes, in which transport blocks are transmitted. FIG. 2B illustrates transmission intervals 211 for the PUSCH; however, similar transmission intervals may be defined or other channels as well, e.g., on the PDSCH, the PUCCH, and the PDCCH. FIG. 2B also illustrates aspects of the 3GPP LTE HARQ protocol.

HARQ is a mechanism used in LTE to handle retransmission of missing or erroneously transmitted messages. The HARQ procedure comprises providing acknowledgement messages positively acknowledging (ACK) or negatively acknowledging (NACK) to the transmitter. Acknowledgement messages are sometimes referred to as HARQ feedbacks. The ACKs and NACKs in 3GPP LTE are provided for each transmission interval 211 according to the output of the decoding procedure applied at the receiver, e.g., Cyclic Redundancy Check (CRC). In order to increase the probability of successfully decoding of a transport block, HARQ is enforced by the soft combining technique. In 3GPP LTE, a special soft combining technique is used, i.e., the so-called incremental redundancy, consisting in temporarily storing at the receiver side the erroneously received message and combining it with the retransmitted replicas of that messages as requested by the HARQ feedback. Such replicas contain the same data, but with different encoding, thereby puncturing the encoder output in different ways according to a certain scheme of redundancy versions that depend on the specific retransmission attempt.

According to the 3GPP LTE HARQ techniques, the UL ACKs and NACKs are conveyed by the PHICH 251 utilized for transmission on the radio link 111. The eNB 112 transmits on the PHICH 251 upon detection of an UL transmission on the PUSCH by the terminal 130.

FIG. 2B illustrates the transmission intervals 211 utilized for transmission of payload data on the PUSCH via the radio link 211. The transmission intervals 211 are sometimes also referred to as subframes. In the transmission intervals 211 transport blocks are transmitted. A transmission interval 211 may correspond to one or more time-frequency resource element defined on the radio link 211. E.g., a transmission interval 211 may comprise one or more symbols transmitted via one or more carriers. E.g., the transmission intervals 211 may be grouped into radio frames for facilitating decoding.

Each transmission interval 211 on the PUSCH 201 is associated (illustrated by the diagonal arrow in FIG. 2B) according to a predefined scheme to a certain time-offset transmission interval 261-268 on the PHICH. Because each transmission interval 211 has, e.g., a 1 ms duration, in the example of FIG. 2B a time of four transmission intervals 211 amounting in total to 4 ms is required until receiving the ACK/NACK. A further 4 ms is required until a retransmission opportunity, thus resulting in a retransmission timer value 252 of 8 ms.

The HARQ timing as illustrated in FIG. 2B is illustrative only. Different examples may rely on different HARQ timing, thus resulting in different retransmission timer values 252. E.g., the handling of the HARQ timing differs between time-division duplexing (TDD) and frequency-division duplexing (FDD) technology. In FDD, HARQ feedbacks for a certain transmission interval 211 are expected to be received four transmission intervals 211 after transmission. In TDD, given the different amount of UL/DL occasions within the radio frame, HARQ feedbacks for a certain transmission intervals are supposed to be received at the transmission interval n+k, where n is the subframe of the corresponding transmission interval transmission and k>=4 is such that n+k is an UL or DL transmission interval depending on whether a given HARQ feedback has to be transmitted in UL or DL, respectively.

FIG. 2B illustrates a UL scenario. Similar techniques may be readily applied to a DL scenario. E.g., in legacy implementations, the DL ACKs and NACKs are conveyed by the PUCCH. The terminal 130 transmits on the PUCCH upon detection of a DL transmission on the PDSCH by the eNB 112 (not shown in FIG. 2B).

Figure 3:
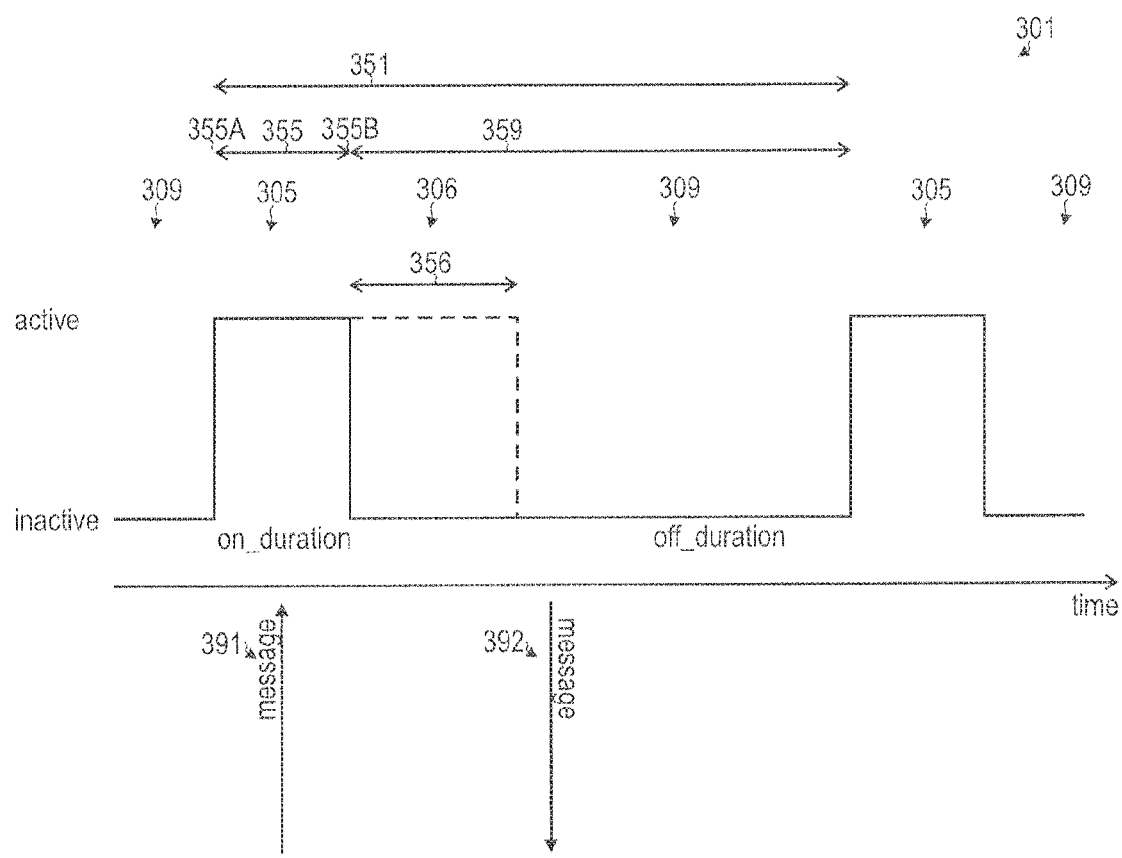
FIG. 3 schematically illustrates a discontinuous reception cycle implemented by the terminal according to various embodiments, the discontinuous reception cycle comprising an active period and an inactive period, wherein the active period has a certain duration which may be determined according to various embodiments.

FIG. 3 illustrates aspects with respect to the discontinuous reception cycle. Hereinafter, details of the discontinuous reception cycle are disclosed in the framework of the 3GPP LTE DRX for illustrative purposes, but similar techniques may be readily employed for other protocols.

Given the bursty nature of packetized traffic, it is sometimes desirable that the terminal 130 switches off at least parts of the receiver circuitry at predefined time periods to limit the battery consumption. When the DRX 301 is active, the terminal 130 periodically listens during an active period 305 (labeled on_duration in FIG. 3) for DL control signaling on the PDCCH. Outside the active period 305, the terminal 130 does not listen for DL control signaling on the PDCCH and the at least parts of the receiver circuitry are switched off. A cycle duration or periodicity 351 of the DRX is longer than the duration 355 active period 305; i.e., the DRX 301 further comprises an inactive period 309 (labeled off_duration in FIG. 3). The duration 359 of the inactive period 309 is complementary to the duration 355 of the active period 305 with respect to the periodicity 351 of the DRX 301.

DL PDCCH commands affected by the DRX 301 may comprise UL grants, i.e., messages allocating resources on the PUSCH utilized for transmission of UL payload data via the radio link. UL grants thus allocate resources in associated transmission intervals 211; the associated transmission intervals 211 may be explicitly or implicitly indicated by the UL grants. DL PDCCH commands affected by the DRX 301 may, alternatively or additionally, comprise DL assignments, i.e., messages indicating explicitly or implicitly resources on the PDSCH utilized for transmission of DL payload data via the radio link 111.

In FIG. 3, a respective first message 391 which may be, e.g., a UL grant or a DL assignment—is illustrated. As illustrated in FIG. 3, the active period 305 has a starting time 355A and an end time 355B which are known to the eNB 120. Thus, the eNB 120 can synchronize transmission of the first message 391 on the PDCCH to fall within the active period 305, thus facilitating reception of the first message 391 by the terminal 130.

According to reference implementations, the active period 305 can be temporarily prolonged for a certain duration 356, corresponding to a certain number of consecutive transmission intervals 211; this extension 306 to the active period 305 is illustrated in FIG. 3 by the dashed line. A corresponding DRX_InactivityTimer may be implemented. In some scenarios, the extension 306 is triggered by reception of any message 391 on the PDDCH during the active period 305. The extension 306 is typically only valid for a single cycle of the DRX 301.

Further, also in a scenario where HARQ transmission or retransmissions are still pending at the end 355B of the active period 305, the active period 305 is prolonged and the receiver circuitry remains switched on to listen to further PDDCH messages (not shown in FIG. 3). Similarly, for UL the active period 305 is extended to comprise the transmission interval 211 at which an HARQ feedback from the eNB 112 is expected to be sent on PHICH.

Figure 4:
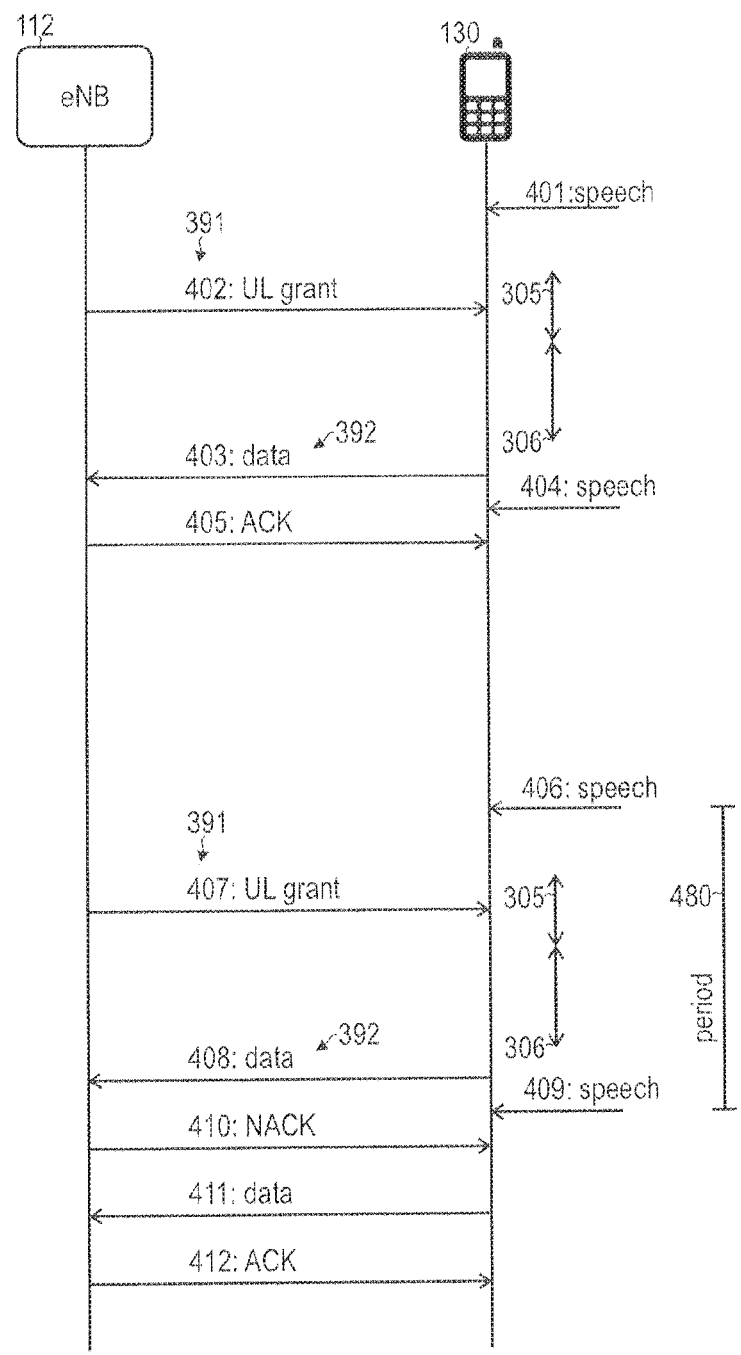
FIG. 4 is a signaling diagram of first and second messages communicated via the radio link according to various embodiments, wherein the first message is transmitted from the access node to the terminal and triggers the terminal to transmit the second message, wherein the first message allocates resources on an UL payload channel utilized for transmission of UL payload data via the radio link, wherein the second message comprises the UL payload data transmitted in accordance with the first message.

Reception of the first message 391 triggers transmission of a second message 392. This is illustrated in FIG. 4. In particular, FIG. 4 illustrates aspects with respect to the first message 391 being a UL grant 402, 407 allocating resources on the PUSCH, wherein the second message 392 comprises the UL payload data 401, 404, 406, 409 transmitted in accordance with the first message 391. As such, the second message may be labeled payload data message 403, 408.

In detail, a first message 391 in form of an UL grant 402 is communicated via the radio link 111 from the eNB 112 to the terminal 130. The UL grant 402 allocates resources on the PUSCH utilized for transmission of UL payload data 401 via the radio link 111. As can be seen, the eNB 112 transmits the UL grant 402 during the active period 305 of the DRX 301. Because of this, the terminal 130 can receive the UL grant 402.

In response to receiving the UL grant 402, the terminal 130 transmits the second message 392, here in form of an UL payload data message 403 comprising the UL payload data 401. The UL payload data message 403 is transmitted at the transmission interval 211 corresponding to the resources allocated by the UL grant 402. Hence, this transmission interval 211 is associated with the first message 391.

Employing the HARQ protocol, the eNB 112, in response to receiving the UL data payload message 403, sends an explicit acknowledgment message 405. The acknowledgment message 405 comprises an indicator positively acknowledging reception of the UL payload data message 403, i.e., positively acknowledging reception of the UL payload data 401. Thus, the acknowledgement message 405 is an ACK.

Meanwhile, further UL payload data 404, 406 has arrived for transmission via the radio link 111. A further first message 391 in the form of a further UL grant 407 is communicated from the eNB 112 to the terminal 130 during the next active period 305 of the DRX 301. A further second message 392 in form of a UL payload data message 408 comprising the UL payload data 404, 406 is communicated from the terminal 130 to the eNB 112 in accordance with the first message 391. However, the UL payload data message 408 arrives corrupted at the eNB 112; hence, the eNB 112 transmits an acknowledgment message 412 comprising an indicator negatively acknowledging reception of the UL payload data message 408, i.e., of the UL payload data 404, 406. This acknowledgement message 412 is a NACK. Due to this received NACK, the terminal 130 retransmits the UL payload data message 411—e.g., using different interleaving or coding—which is eventually received by the eNB 112 uncorrupted and thus is positively acknowledged by the ACK 412.

FIG. 4 illustrates an example where the first message 391 and the second message 392 are associated with the VoLTE service 151. In 3GPP LTE, packets are delivered using IP protocol or, in other words, using a packet switched (PS) communication. I.e., also traditionally circuit switched (CS) services such as conversational voice make use of fast scheduling and will be provided using voice over IP (VoIP). In a typical VoIP arrangement, a voice encoder on the transmitter side (in FIG. 4 the terminal 130) encodes voice into packets. Here, a typical voice duration per packet amounts to approximately 20 milliseconds, see, e.g., Groupe Speciale Mobile Association (GSMA) IR.92 V.9.0 (April 2015).

As illustrated in the scenario of FIG. 4, the VoLTE UL payload data 401, 404, 406, 409—sometimes referred to as voice packets—comprising conversational voice is delivered by higher layers to the lower layers of the transmission protocol stack 290 of the terminal 130 at a certain periodicity 480, e.g., corresponding to 20 milliseconds.

VoLTE enables 3GPP LTE-based cellular networks 113 to provide voice services. The mouth-to-ear delay introduced by the transport scheduling and transmission of the VoLTE voice packets is one of the major factors determining the experienced voice quality. This typically causes a relatively tight delay budget for VoLTE to ensure good voice quality. The normal QoS requirement corresponding to latency for a VoLTE service 151 at the eNB 112 amounts to 100 or 80 milliseconds—e.g., corresponding to an inter-PDCP layer 292 delay. In some examples, QoS requirements corresponding to latency of 60 ms, 40 ms, or even less may be imposed by the service—e.g., corresponding to the inter-PDCP layer 292 delay.

In some examples, the inter-PDCP layer 292 delay may correspond to a latency measured between the PDCP layer 292 of the terminal 130 and the PDCP layer 292 of the PGW 118. Typically, the inter-PDCP layer 292 delay measured between the terminal 130 and the PGW 118 amounts to 100 ms. In further examples, the inter-PDCP layer 292 delay may correspond to a latency measured between the PDCP layer 292 of the terminal 130 and the PDCP layer 292 of the eNB 112. Typically, such an inter-PDCP layer 292 delay between the terminal 130 and the eNB 112 may be shorter than the inter-PDCP layer 292 delay between the terminal 130 and the PGW 118. E.g., the inter-PDCP layer 292 delay between the terminal 130 and the eNB 112 may amount to 80 ms.

Up to the limit of the delay budget, a good voice quality is experienced by the user. I.e., it is typically sufficient to schedule a VoLTE payload data message every 40 milliseconds to bundle two UL payload data comprising conversational voice. This is illustrated in FIG. 4 where, e.g., the UL payload data voice packets 404, 406 are bundled and mapped together to the UL payload data message 408.

Due to this bundling scheme, the DRX 301 is configured with a respective periodicity 351 of 40 ms. Since the UL payload data voice packets 401, 404, 406, 409 are produced every 20 ms, as explained above such a configuration of the DRX 301 allows for transmission of the UL payload data voice packets 401, 404, 406, 409 packets every 40 ms. Such a scheduling technique typically allows for a good balance between efficient usages of resources, a good voice quality, and enhanced battery performance. In particular, an efficient use of the PDCCH and other scheduling resources is achieved, while the scheduling delay enables to meet the QoS requirement corresponding to latency. Such techniques of the VoLTE service 151 may be applied for the various examples disclosed herein VoLTE is generally a bidirectional PS voice communication, however, in FIG. 4 only unidirectional UL communication of the voice packets is illustrated for simplicity.

Figure 5:
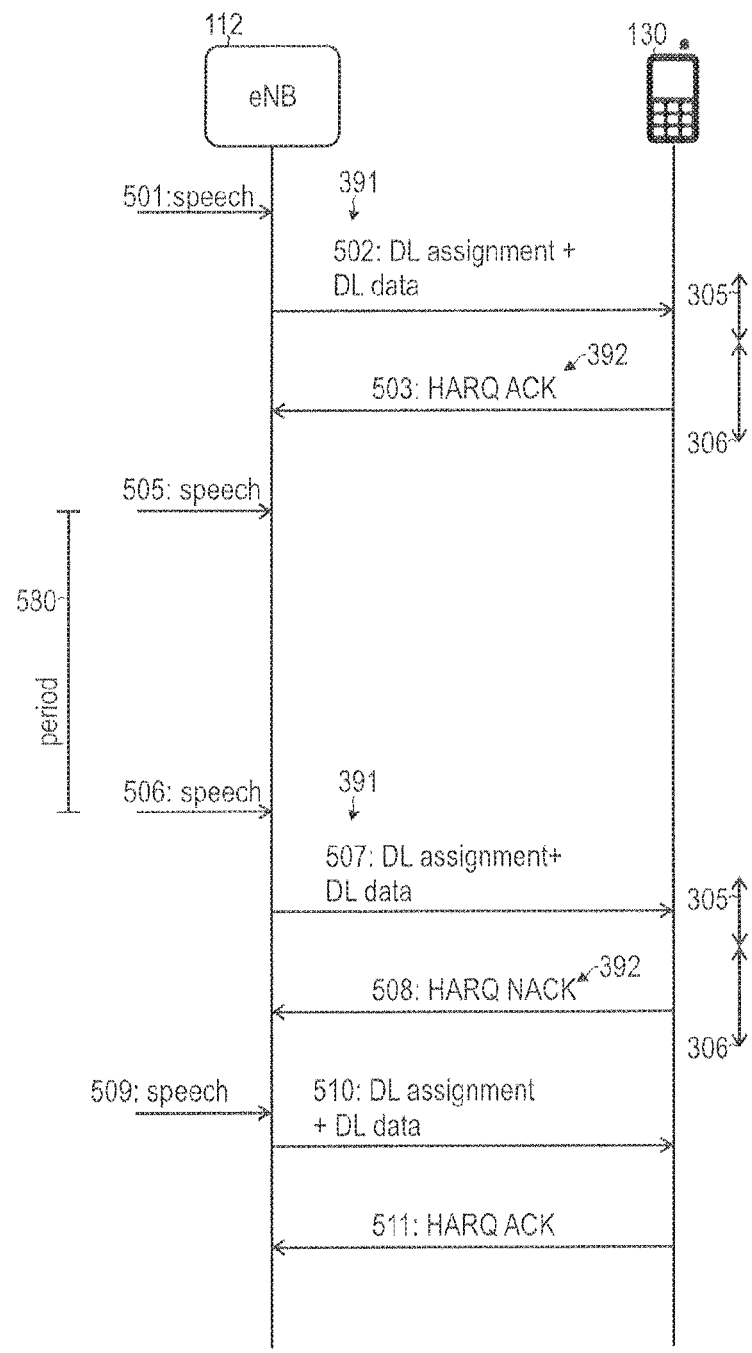
FIG. 5 is a signaling diagram of first and second messages communicated via the radio link according to various embodiments, wherein the first message is transmitted from the access node to the terminal and triggers the terminal to transmit the second message, wherein the first message specifies resources on a DL payload channel utilized for transmission of DL payload via the radio link, wherein the second message comprises an indicator positively or negatively acknowledging reception of the DL payload data transmitted in accordance with the first message.

FIG. 5 generally corresponds to FIG. 4 and illustrates aspects with respect to DL communication of the voice packets of the VoLTE service 151 employing the DRX 301. Also in the scenario of FIG. 5, DL payload data voice packets 501, 505, 506, 509 comprising conversational voice are generated with a given periodicity 580 of, e.g., 20 milliseconds. The DL payload data voice packets 501, 505, 506, 509 are bundled and mapped to DL payload data messages communicated in conformity with DL assignments 502, 507, 510, the combined DL assignments 502, 507, 510 and DL payload data messages corresponding to the first messages 391. Here, the DL assignments 502, 507, 510 specify the resources on the DL PDSCH in which the DL payload data messages are communicated.

Reception of the first messages 391 triggers the terminal 130 to transmit second messages 392 being acknowledgment messages 503, 508, 511 of the ARQ protocol implemented by the MAC layer utilized for transmission via the radio link 111. The acknowledgment messages 503, 508, 511 comprise indicators positively or negatively acknowledging reception of the DL payload data messages, i.e., of the DL payload data voice packets 501, 505, 506 transmitted in accordance with the respective first messages 391.

Also in the scenario of FIG. 5, the first messages 391 are transmitted by the eNB 112 during the active period 305 of the DRX 301, thereby facilitating reception of the first messages 391 by the terminal 130.

Figure 6:
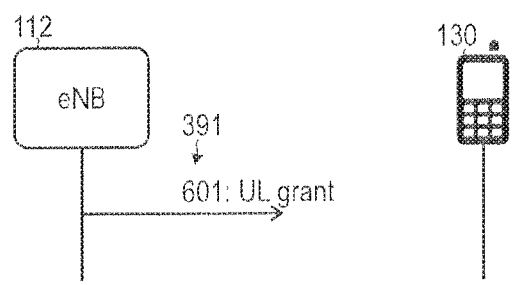
FIG. 6 is a signaling diagram illustrating a discontinuous transmission event for the scenario of FIG. 4.
Figure 7:
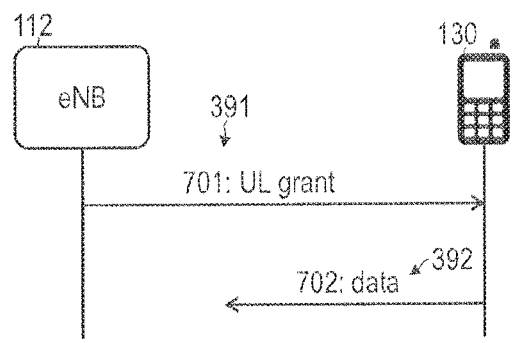
FIG. 7 is a signaling diagram illustrating a discontinuous transmission event for the scenario of FIG. 4.

In the scenarios disclosed above with respect to FIGS. 4 and 5, DTX events can occur. FIGS. 6 and 7 illustrates DTX events for the UL scenario of FIG. 4. A first DTX event corresponds to erroneous transmission of the first message 391, i.e., of an UL grant 601. In particular, the UL grant 601 is not received by the terminal 130. A second DTX event (cf. FIG. 7) corresponds to erroneous transmission of the second message 392 in form of the UL data payload message 702 comprising UL payload data.

The eNB 112 may not be able to distinguish between the first and second examples of DTX events as illustrated by FIGS. 6 and 7, respectively. Thus, the HARQ protocol may force the eNB 112 to retransmit the initial PDDCH command 601, 701.

Figure 8:
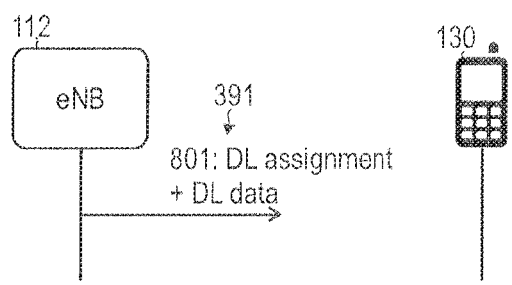
FIG. 8 is a signaling diagram illustrating a discontinuous transmission event for the scenario of FIG. 5.
Figure 9:
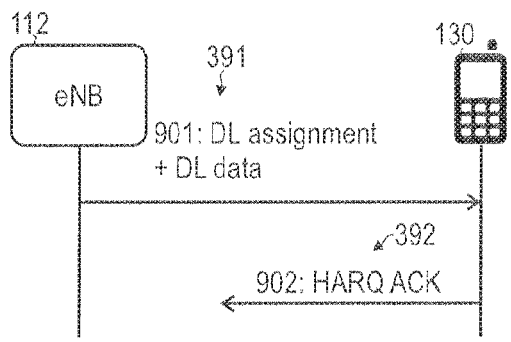
FIG. 9 is a signaling diagram illustrating a discontinuous transmission event for the scenario of FIG. 5.
Figure 10:
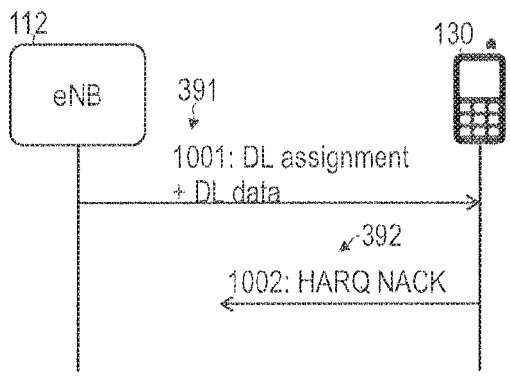
FIG. 10 is a signaling diagram illustrating a discontinuous transmission event for the scenario of FIG. 5.

Further, FIGS. 8-10 illustrate DTX events for the DL scenario of FIG. 5. A first DTX event, as illustrated by FIG. 8, corresponds to erroneous transmission of the first message 391, i.e., of the combined DL assignment and DL payload data message 801. In particular, the combined DL assignment and DL payload data message 801 is not received by the terminal 130. A second DTX event (cf. FIG. 9) corresponds to erroneous transmission of the second message 392 in form of an ACK 902, i.e., an acknowledgment message of the ARQ protocol comprising an indicator positively acknowledging reception of the DL payload data comprised in the combined DL assignment and DL payload data message 901 previously received by the terminal 130. A third DTX event (cf. FIG. 10) corresponds to erroneous transmission of the second message 392 in form of a and NACK 1002, i.e., an acknowledgment message of the ARQ protocol comprising an indicator negatively acknowledging reception of the DL payload data comprised in the combined DL assignment and DL payload data message 1001 previously received by the terminal 130.

Again, the eNB 112 may not be able to distinguish between the first, second and third examples of DTX events as illustrated by FIGS. 8-10, respectively. Thus, the HARQ protocol may force the eNB 112 to retransmit the initial PDDCH command 801, 901, 1001.

While with respect to FIGS. 6-10 DTX events for the eNB 112 have been disclosed, similar DTX events can occur for the terminal 130.

Figure 11:
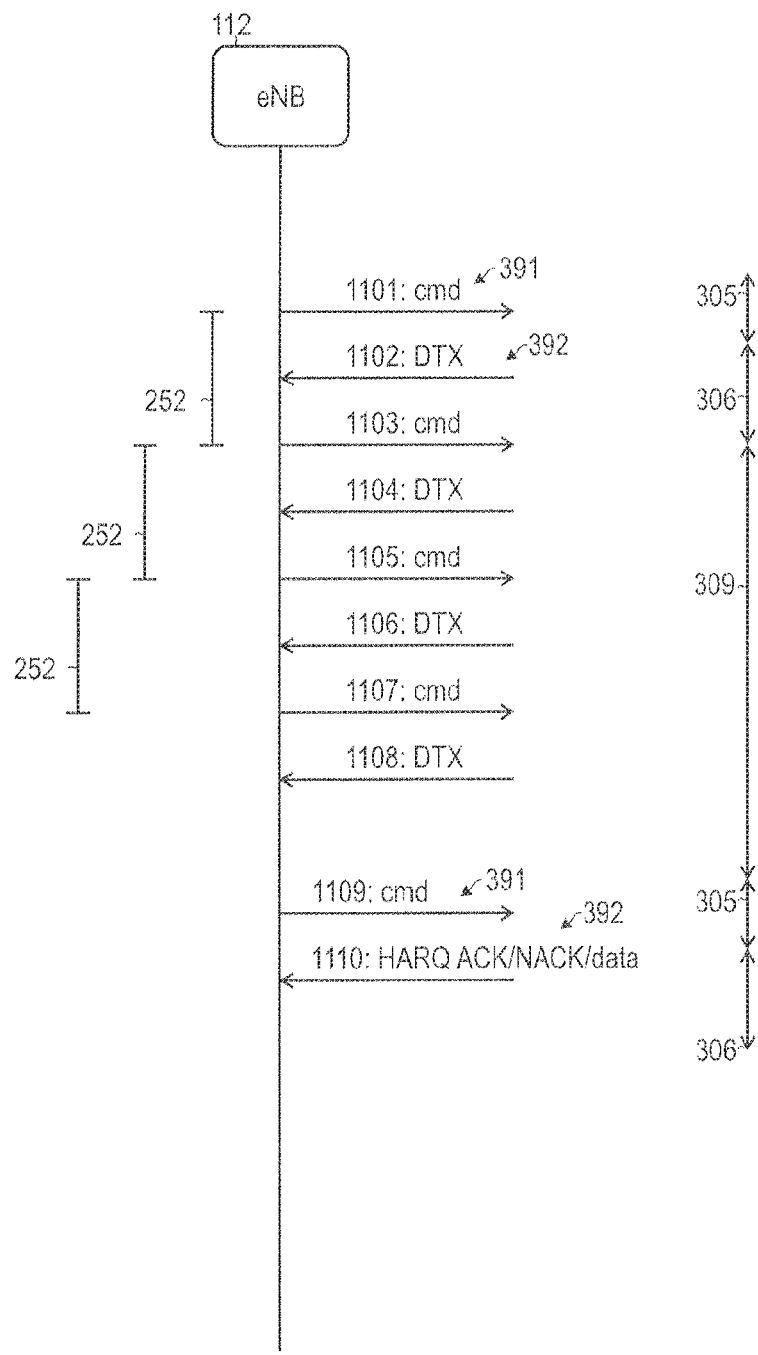
FIG. 11 is a signaling diagram illustrating effects of the discontinuous reception cycle on the discontinuous transmission events according to various embodiments, wherein the discontinuous reception cycle has an active period of a first duration.

FIG. 11 illustrates effects caused by DTX events on transmission of the UL or DL payload data. First, the first message 391 comprising a PDCCH command 1101 is transmitted from the eNB 112 towards the terminal 130. E.g., the PDCCH command 1101 may be a DL assignment or a UL grant, as illustrated above with respect to FIGS. 4-10. In response to transmitting the first message 391, the eNB 112 monitors the radio link 111 for reception of the second message 392 at the associated transmission interval 211. However, instead of receiving the second message 392 uncorrupted or at least identifiable, a DTX event 1102 occurs. Due to the DTX event 1102, the eNB 112 re-attempts to transmit the initial PPDCH command at 1103. However, retransmission of the PDDCH command 1103 fails, because the terminal 130 already operates in the inactive period 309 of the DRX 301 at that time.

As can be seen from FIG. 11, in response to the initial DTX event 1102, the eNB 112 is configured to attempt retransmission of the initial PDCCH command 1101 in form of the PDCCH commands 1103, 1105, 1107 for a certain amount of retransmission time and/or a certain number of retransmission attempts. This is because the eNB 112 cannot distinguish the actual reason leading to the DTX event 1102. All retransmission attempts, however, lead to DTX events 1104, 1106, 1108, because the terminal 130 is in the inactive period 309 of the DRX 301.

In particular, the extended active period 306 might not have been triggered, because the terminal 130 didn't receive the PDCCH command 1101. It is also possible that even the extended active period 306 is too short to offer an occasion for reception of a retransmission attempt (this is illustrated in FIG. 11).

Where all retransmission attempts fail, the corresponding MAC PDU may be discarded. The HARQ process may be aborted. Re-scheduling attempts fail, because the terminal 130 is sleeping during the inactive period 309.

The PDCCH command 1109 transmitted during the next active period 305 is successfully received by the terminal 130 and, consequently, a second message 392 is received implementing, e.g., an acknowledgment message of the ARQ protocol or a UL payload data message 1110.

As can be seen from FIG. 11, because the active period 305 of the DRX 301 is dimensioned comparably short, retransmission of the PDCCH command of the first message 391 is deemed to fail; before the first retransmission attempt can be executed, the terminal 130 has already switched to the inactive period 309 of the DRX 301. In particular, the duration 355 of the active period 305 is shorter than the retransmission timer value 252 of the ARQ protocol, which is, however, not a germane criterion for failed retransmission attempts.

Failed retransmission attempts may degrade the experienced quality for latency-sensitive services such as the VoLTE service 151. In particular, a QoS requirement corresponding to latency may not be met.

Hereinafter, techniques are illustrated which enable determining of the duration 355 of the active period 305 of the DRX 301 to mitigate such problems. In particular, monitoring reception of the second message 392 can be used as the decision criterion for determining the duration 355 of the active period 305 of the DRX 301. Such techniques enable to tailor the duration 355 of the active period 305 in view of latency requirements. A quality of user experience may be increased.

E.g., said monitoring can be for failed reception of the second message 392 at the associated transmission interval 211; hence, it is possible that DTX events are monitored. E.g., a larger (smaller) number of DTX events for a first message 391 can lead to determining a longer (shorter) duration 355 of the active period 305 of the DRX 301. Thus, a relative frequency of occurrence of the DTX events may be used as the decision criterion for determining the duration 355 of the active period 305 of the DRX 301. In scenarios where the first message relates to an UL grant allocating resources in a future time interval 211, the duration 355 of the active period 305 may be dimensioned longer than the difference between current time and this future time interval.

Also, it is possible that where an increased number of DTX events is detected, the duration 355 of the active period 305 is determined to be longer than the retransmission timer value 252 of the ARQ protocol. Such a scenario is illustrated with respect to FIG. 12 and FIG. 13. Here, it is illustrated how a longer duration 355 of the active period 305 of the DRX 301 facilitates reduction of DTX events and enables to implement the VoLTE service 151 obeying a comparably strict QoS requirement corresponding to latency.

Figure 12:
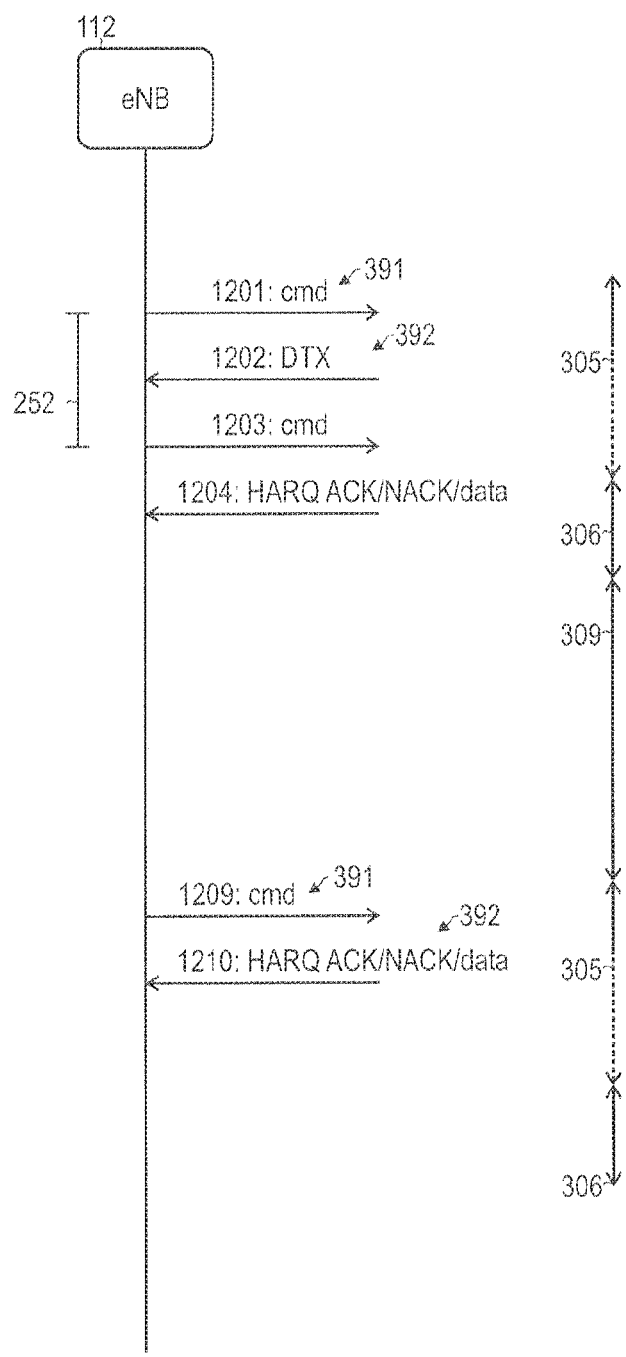
FIG. 12 is a signaling diagram illustrating effects of the discontinuous reception cycle on the discontinuous transmission events according to various embodiments, wherein the discontinuous reception cycle has an active period of a second duration which is longer than the first duration of FIG. 11.

In FIG. 12, a scenario is shown, where the first message 391 comprising a PDCCH command 1201 is transmitted by the eNB 112 towards the terminal 130 and triggers a DTX event 1202 which is identified by monitoring the radio link 111 for reception of the second message 392 at the transmission interval 211 associated with the first message 391. Thus, the eNB 112 attempts to retransmit the initial PDCCH command at 1203. From a comparison of FIGS. 11 and 12, it is apparent that 1101-1103 generally correspond to 1201-1203.

However, in FIG. 11, the duration 355 of the active period 305 of the DRX 301 has been selected to be longer than the retransmission timer value 252, hence longer than in the example of FIG. 11 (as illustrated by the dotted part of the arrow in FIG. 12). Because of this, the retransmission attempt of the PDCCH command 1203 is not deemed to fail; in the scenario of FIG. 12, the PDCCH command 1203 is successfully received by the terminal 130 during the prolonged active period 305 and a corresponding acknowledgment message or UL payload data message 1204 is received by the eNB 112. 1209, 1210 generally correspond to 1307, 1308.

Figure 13:
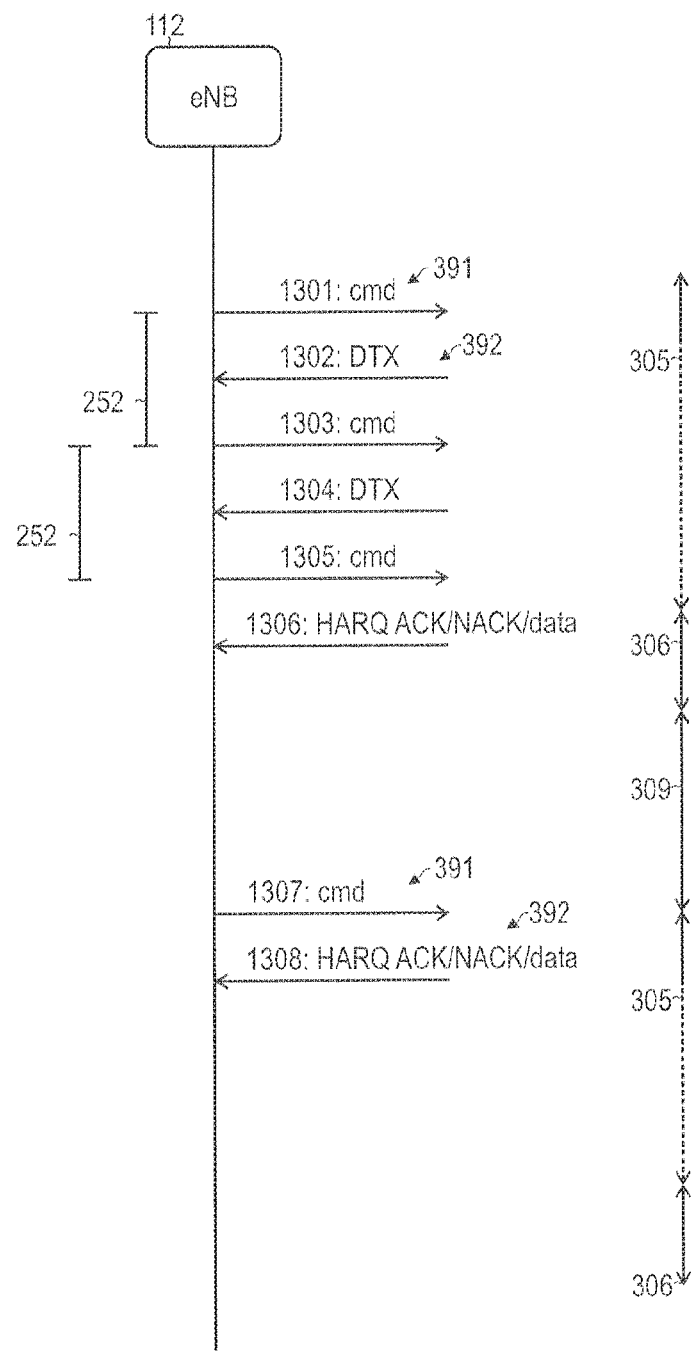
FIG. 13 is a signaling diagram illustrating effects of the discontinuous reception cycle on the discontinuous transmission events according to various embodiments, wherein the discontinuous reception cycle has an active period of a third duration which is longer than the first duration of FIG. 11 and the second duration of FIG. 12.

FIG. 13 illustrates a scenario where an even longer duration 355 of the active period 305 is determined and implemented. In particular, a duration 355 of the active period 305 which is longer than twice the retransmission timer value 252 is selected. This allows to implement two retransmission attempts 1303, 1305 of an initial PDCCH command 1301 which triggered an DTX event 1302. 1306, 1307, and 1308 generally correspond to 1204, 1209, and 1210.

As can be seen, the various durations 355 of the active period 305 may be flexibly selected in the various examples disclosed herein. E.g., in the various disclosed examples, the determining of the duration 355 of the active period 305 of the discontinuous reception cycle 301 may comprise selecting at least between a first duration 355 of the active period 305 and a second duration of the active period 305, wherein the first duration is shorter than a multiple N of the retransmission timer value 252 of the ARQ protocol implemented by the MAC layer 294 utilized for transmission via the radio link 111; the second duration may then be longer than the multiple N of the retransmission timer value. E.g., in some examples, the first duration may be shorter than the single retransmission timer value 252 (cf. FIG. 11). N may be an integer, e.g., in the range of 2-100, or in the range 2-50, or in the range 5-15, etc. E.g., different values of N may be selected depending on the QoS requirements, e.g., corresponding to latency, of an associated service such as the VoLTE service 151. E.g., the values of N may be negotiated between the eNB 112 and the terminal 130. In other examples, the terminal 130 or the eNB 112 may autonomously select appropriate values of N and optionally inform other entities accordingly.

Figure 14:
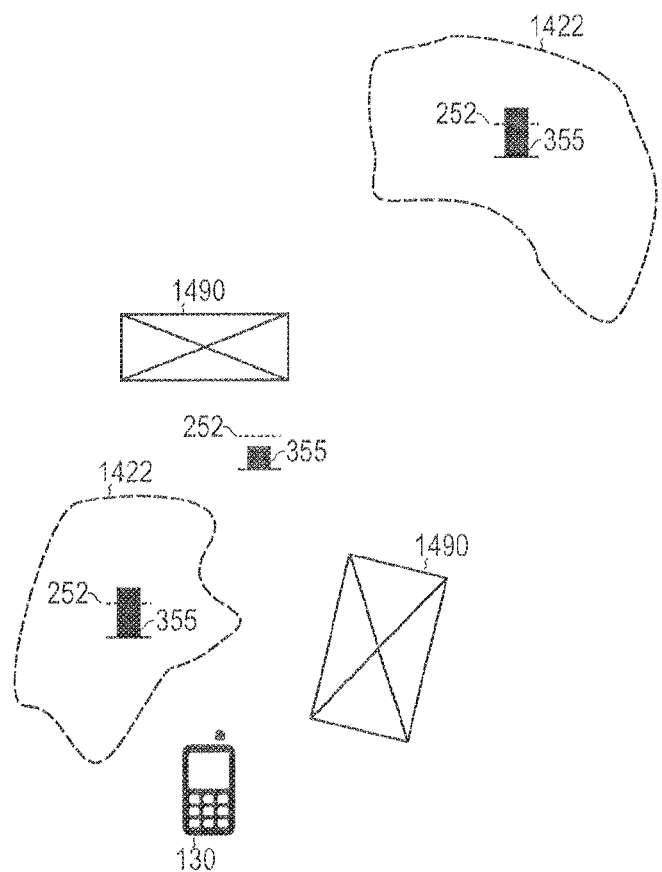
FIG. 14 schematically illustrates determining of the duration of the active period of the discontinuous reception cycle for a geoarea covered by the cellular network according to various embodiments.

FIG. 14 illustrates aspects with respect to determining the duration 355 of the active period 305 of the DRX 301 for an area 1422 covered by the cellular network 113. In particular, in FIG. 14, a location of the terminal 130 is illustrated with respect to certain environmental features 1490 which can cause areas 1422 of degraded transmission quality on the radio link 111. In particular, the areas 1422 in the scenario of FIG. 14 are defined on a sub-cell level, i.e., have extents which are smaller than extents of a cell of the cellular network 113. In some scenarios, it is possible that the duration 355 of the active period 305 of the DRX 301 is determined area-specific, i.e., differently, for different areas 1422. E.g., in the scenario FIG. 14, inside the areas 1422, a duration 355 of the active period 305 is selected which is longer than the retransmission timer value 252; whereas, outside the areas 1422, a duration 355 of the active period 305 is selected which is shorter than the retransmission timer value 252. In other examples, other durations 355 may be determined.

Figure 15:
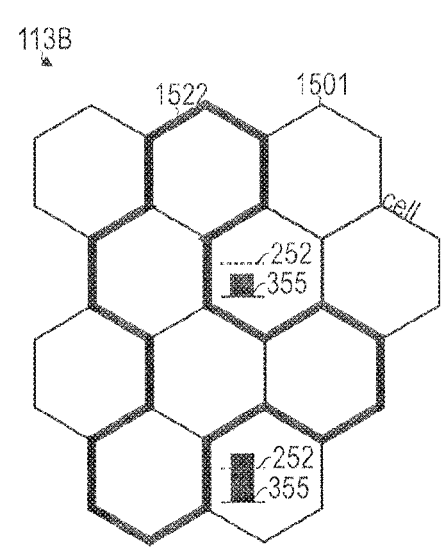
FIG. 15 schematically illustrates determining of the duration of the active period of the discontinuous reception cycle for a cell and a tracking area covered by the cellular network according to various embodiments.

FIG. 15 also illustrates aspects with respect to determining the duration 355 of the active period 305 of the DRX 301 for areas 1501, 1522 covered by the cellular network 113. In FIG. 15, the areas 1501, 1522 are defined with respect to cells and tracking areas of the cellular network 113, respectively.

Determining the duration 355 for one or more areas 1422, 1501, 1522 allows to flexibly adapt the duration 355 to the noise environment of the radio link 111 at a high accuracy.

Communication on the PUCCH affected by the DRX 301 can generally relate to various services implemented by the terminal 130 and the cellular network 113. However, different DRXs 301 can be implemented by the terminal 130 in response to initializing different services. E.g., if a service having a comparably relaxed QoS relating to latency is active, a shorted duration 355 of the active period 305 may be implemented.

It is possible that the duration 355 of the active period 305 of the DRX 301 is determined for a plurality of services implemented by the cellular network 113 and the terminal 130.

Hence, it is possible that one and the same duration 355 of the active period 305 of the DRX 301 is employed alike for the plurality of services, i.e., irrespective on the particular service initialized. In other examples, it is also possible, that for different services different durations 355 are determined.

Figure 16:
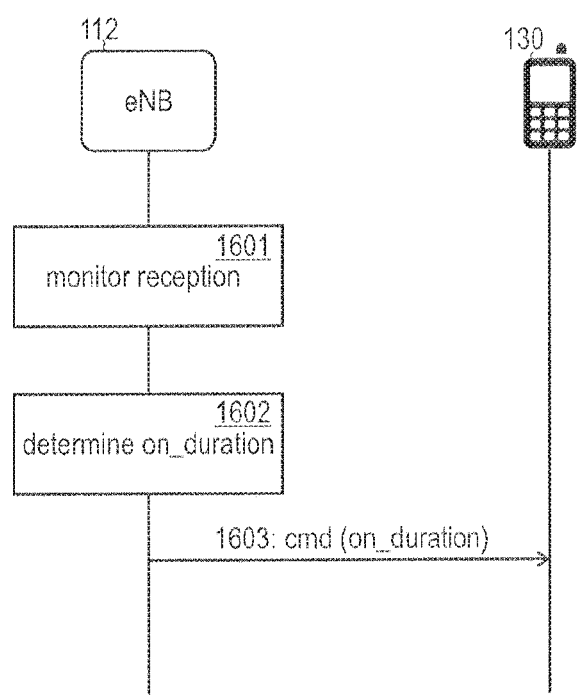
FIG. 16 is a signaling diagram illustrating transmission of a control message from the access node and to the terminal according to various embodiments, the control message including an indicator indicating the duration of the active period of the discontinuous reception cycle and triggering the terminal to implement the duration of the active period of the discontinuous reception cycle.

FIG. 16 illustrates aspects with respect to implementing a determined duration 355 of the active period 305 of the DRX 301. Here, the eNB 112 monitors reception of the second message 392 at the transmission interval 211, 1601; and determines the duration 355 of the active period 305 of the DRX 301 based on said monitoring, 1602. Then, a control message 1603 is transmitted by the eNB 112 to the terminal 130, e.g., employing RRC signaling on the PDCCH. The control message 1603 includes an indicator indicating that duration 355 of the active period 305 of the DRX 301 as determined at 1602. The control message 1603 triggers the terminal 130 to implement the duration 355 as indicated by the control message 1603.

The indicator of the control message 1603 may explicitly or implicitly indicate the duration 355. E.g., the indicator may be a multi-bit value corresponding to a duration 355 specified in terms of milliseconds or in terms of a number of transmission intervals 211. In other examples, the indicator may be of the type «enum» and may implicitly indicate the duration 355, e.g., according to a pre-defined lookup table. Where the indicator indicates the duration 355 spatially-resolved for an area 1422, 1501, 1522, techniques of geofencing and/or geomessaging may be employed. Further, where the indicator indicates the duration 355 subscriber-specific for a plurality of terminals 130, indicators such as the International Mobile Subscriber Identity (IMSI) may be employed.

The control message 1603 may be transmitted in response to determining the new duration 355 at 1602; i.e., the control message 1603 may be transmitted in a well-defined temporal context with respect to determining the new duration 355. Such a scenario facilitates quick implementation of a newly determined duration 355 of the active period 305 of the DRX 301.

Alternatively or additionally, it is also possible that the control message 1603 is transmitted in response to initializing a new service implemented by the cellular network 113 and the terminal 130. E.g., once a new bearer 150 is set up, it is possible that the duration 355 is indicated to the terminal 130, thereby facilitating reduced overhead signaling by re-using existing control signaling.

Alternatively or additionally, it is also possible that the control message 1603 is piggy-backed on existing, pre-scheduled RRC control signaling. This reduces overhead.

Figure 17A:
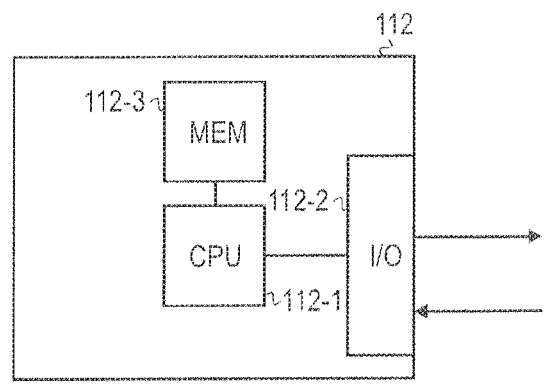
FIG. 17A is a schematic illustration of a network node according to various embodiments.

FIG. 17A is a schematic illustration of a network node 112. The network node can be embodied as an access node of a cellular network and in particular as the eNB 112 described above. The network node 112 comprises a processor 112-1, an interface 112-2 for communication via the radio link 111 in, both, UL and DL, and a memory 112-3. E.g., the memory 112-3 may be a non-volatile memory. The memory 112-3 stores control instructions that can be executed by the processor 112-1. Executing the instructions causes the processor 112-1 to perform techniques as disclosed herein, e.g., relating to:

transmitting the first message 391; monitoring the radio link 111 for reception of the second message 392; determining the duration 355 of the active period 305 of the DRX 301; performing scheduling for UL payload data and/or DL payload data; transmitting the control message 1603; etc.

Figure 17B:
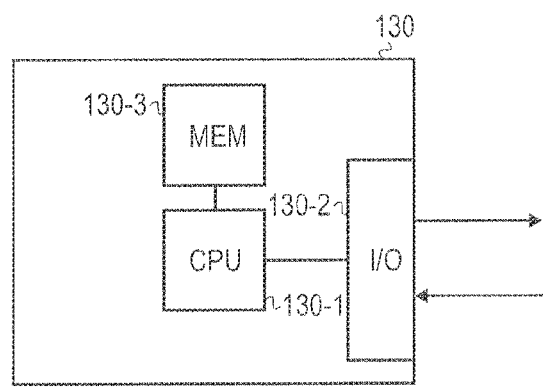
FIG. 17B is a schematic illustration of a terminal according to various embodiments.

FIG. 17B is a schematic illustration of the terminal 130. The terminal 130 comprises a processor 130-1, an interface 130-2 for communicating via the radio link 111 in, both, UL and DL, and a memory 130-3. E.g., the memory 130-3 may be a non-volatile memory. The memory 130-3 stores instructions that can be executed by the processor 130-1. Executing the instructions causes the processor 130-1 to perform techniques as disclosed herein, e.g., relating to: receiving the first message 391; transmitting the second message 392; receiving the control message 1603; etc.

Figure 18:
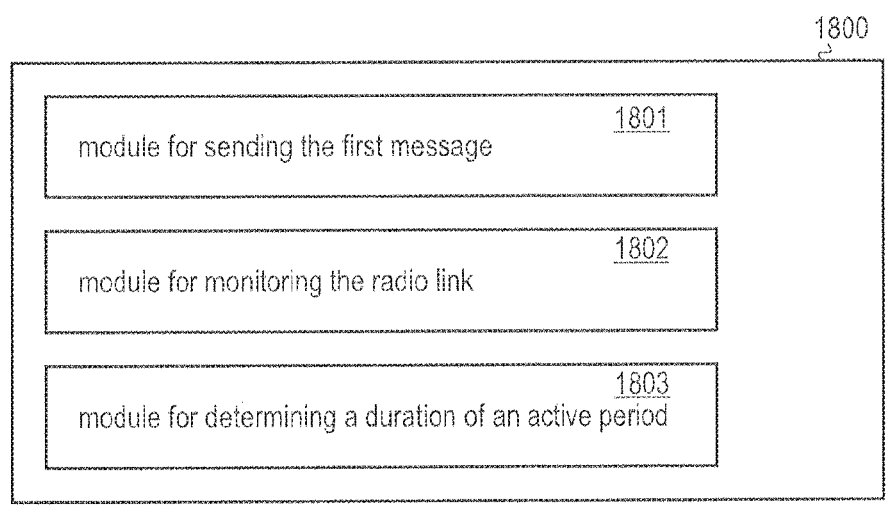
FIG. 18 is a schematic illustration of a network node according to various embodiments.

FIG. 18 is a schematic illustration of a further network node 1800 according to various embodiments. E.g., the network node 1800 may be embodied as an access node and in particular as the eNB 112 described above. The network node 1800 comprises a module 1801 for sending the first message 391. The network node 1800 comprises a module 1802 for monitoring the radio link 111 the network node 1800 comprises a module 1803 for determining the duration 355 of the active period 305 of the DRX 301.

Figure 19:
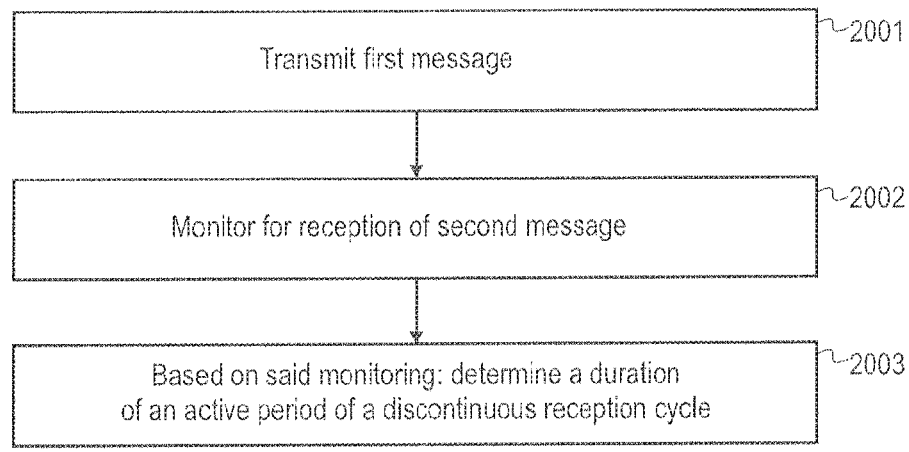
FIG. 19 is a flowchart of a method according to various embodiments.

FIG. 19 is a flowchart of a method according to various embodiments. First, the first message 391 is transmitted, 2001. Next, the radio link 111 is monitored to for reception of the second message 392, 2002. In particular, the first message 391 triggers the terminal 130 to transmit the second message 392 via the radio link 111 at an associated transmission interval 211. The first message 391 may correspond to a PDCCH command, e.g., an UL grant or an DL assignment. The transmission interval 211 may be associated by, e.g., respective properties of the ARQ protocol where resources on the PHICH are fixedly assigned to certain transmission intervals 211 on the PDCCH at which the first message 391 is transmitted. In other examples, the transmission interval 211 may be associated by, e.g., certain resources allocated by the first message 391 on the PUSCH utilized for transmission of UL payload data via the radio link 111 employing the second message 392.

Then, based on the monitoring at 2002, the duration 355 of the active period 305 of the DRX 301 is determined, 2003. Here, longer (shorter) durations 355 may be selected for a larger (smaller) numbers of DTX events detected at 2002.

In some scenarios, in order to collect meaningful statistics, it is possible that the duration 355 is determined based on monitoring for reception of a plurality of second messages 392, transmission of which has been triggered by a respective plurality of first messages 391. In particular, by considering a plurality of DTX events, one-time exceptional circumstances may not be overweighted.

Further, in some examples, the duration 355 is determined based on communication with a single terminal 130, only; hence, all first messages 391 may be transmitted to one and the same terminal 130. Such an example may in particular be implemented where the duration 355 is determined terminal-specific or subscriber-specific.

In other examples, the duration 355 is based on communication with the plurality of terminals 130; here, different first messages 391 may be transmitted to different terminals 130. Thus, a plurality of first messages 391 may be transmitted via the radio link 111 to a plurality of terminals 130, each one of the plurality of first messages 391 triggering a respective terminal 130 to transmit a respective second message 392 via the radio link 111 at a respectively associated transmission interval 211. The radio link 111 may then be monitored for reception of the second messages 392 at the associated transmission intervals 211, potentially received from the different terminals 130. By considering a plurality terminals 130, meaningful statistics may be collected within a comparably short timeframe.

Figure 20:
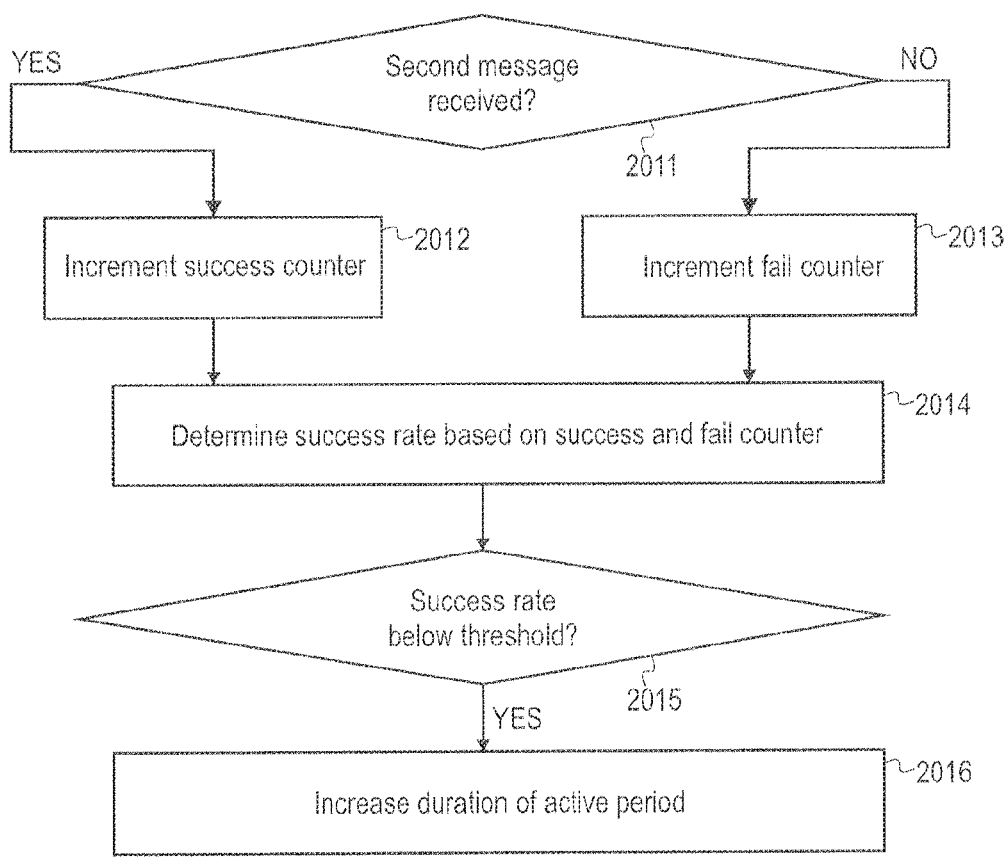
FIG. 20 is a flowchart of a method according to various embodiments.

FIG. 20 is a flowchart of a method according to various embodiments. FIG. 20 illustrates aspects with respect to a success counter and a fail counter and a success rate. In the scenario of FIG. 20, reception of the second messages 392 is monitored in view of DTX events. In particular, at 2011, it is checked whether a DTX event is present, i.e., if a second message has been received. If a second message 392 is received at the associated transmission interval 211 in response to sending the corresponding first message 391, a DTX event is not present. Hence, at 2012, a success counter is incremented. Differently, if a second message 392 is not received in response to sending a corresponding first message 392, a DTX event is present and a failure counter is incremented 2013.

While in FIG. 20 dedicated success and fail counters 2012, 2013 are maintained, in other examples only one of the success and fail counters 2012, 2013 may be implemented—while the total number of first and second messages 391, 392 is also tracked.

At 2014, a success rate is determined by comparing the value of the success counter with the value of the failure counter. Yet, the success rate 2014 may only be determined once significant statistics has been accumulated, i.e., only after the radio link 111 has been monitored for reception of a significant number of second messages 392.

E.g., the success rate may be determined as follows:

$$\frac{\text{No. of detected } UL \text{ payload data msg}}{\text{No. of initial } PDCCH \text{ cmd}} ++$$

$$\frac{\text{No. of detected acknowledgement msg on } PUCCH \text{ in response to initial } PDCCH \text{ cmd}}{\text{No. of initial } PDCCH \text{ cmd}}$$

This may be expressed as:

$$\frac{\text{success counter}}{\text{success counter} + \text{failure counter}}$$

Then, at 2015, it is checked whether the success rate—which has been determined at 2014—is below a threshold. If the success rate, at 2015, is below the threshold, the duration of the active period is increased, 2016, e.g., above a retransmission timer value 252 of the ARQ protocol.

While the scenario of FIG. 20 is illustrated with respect to a success rate, in different examples, it is also possible to implement a failure rate with a respectively adapted threshold. E.g., the failure rate or DTX rate may be determined as follows:

$$\frac{\text{No. of detected } DTX \text{ events}}{\text{No. of initial } PDCCH \text{ cmd}} = \frac{\text{failure counter}}{\text{success counter} + \text{failure counter}}$$

Here, the No. of detected DTX events may be given by the sum of a No. of HARQ DTX events where the initial PDDCH command is a DL assignment and a No. of PUSCH DTX events where the initial PDCCH command is an UL grant. As can be seen, the success rate and failure rate may be complementary to each other.

In a scenario where all first and second messages 391, 392 are associated with the same at least one service implemented by the cellular network 113 and the terminal 130, it is possible to determine the threshold used at 2015 based on a QoS requirement of this at least one service. E.g., for services having a comparably strict QoS requirement corresponding latency, it is possible to determine the threshold such that the increase of the duration of the active period triggered at a high sensitivity in response to DTX events. By using a service-specific threshold, requirements of low energy consumption and reduced latency can be balanced.

Figure 21:
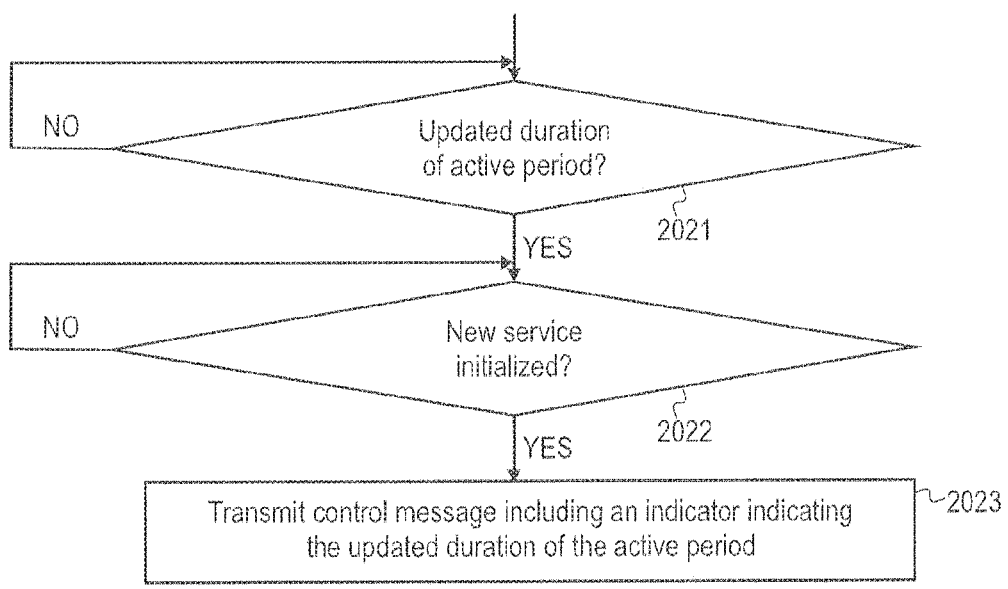
FIG. 21 is a flowchart of a method according to various embodiments.

Next, a specific example is given for determining the threshold at 2015. Considering a scenario where conversational voice is communicated as part of, e.g., the VoLTE service 151, two higher-layer voice packets are typically bundled into a single payload data message communicated via PUSCH or PDSCH (as explained above with respect to FIGS. 4 and 5). For silence, no bundling takes place. Assuming a voice activity factor (VAF) of 50%, a failure rate of more than 0.7% results in unacceptably high packet loss, degrading the service quality as perceived by the user. This is in view of a standard definition of a maximum of 1% packet loss for an acceptable voice quality, assuming that no further restrictions on the QoS exist. Then, a threshold can be determined, assuming that a user is satisfied if 99% of all voice packets are delivered in time. Under the assumption that an DTX event of the initial PDCCH command, i.e., the first message 391, is the sole reason for delaying/losing voice packets, the following applies: assuming 50% VAF, the eNB 112 schedules two voice packets due to packet bundling per payload data message. Payload data messages are communicated 25 times per second for voice active and 6.5 times per second for silence. Hence, on average, (2×2.5+ 1×6.5)/31.5=1.823 voice packets are scheduled per payload data message. Here, a failure rate of 100%/1.823=0.549% causes a subscriber to be unsatisfied; the threshold should be determined accordingly. Two voice packets per payload data message are not delayed necessarily the same way such that the packet delay budget is violated, but—on the other hand—it isn't the only reason for packet loss or delay. Therefore, the threshold should be tunable. FIG. 21 is a flowchart of a method according to various embodiments. At 2021, it is checked whether an updated duration 355 of the active period 305 is present. I.e., at 2021, it can be checked whether recently a new duration 355 has been determined. If this is the case, at 2022 it is checked whether new a service is initialized by the terminal 130 and the cellular network 113, e.g., by establishing a respective bearer 150. If this is the case, then at 2023, the control message 1603 is transmitted from the eNB 112 to the terminal 130. The control message 1603 includes an indicator indicating the updated duration of the active period 305, e.g., explicitly or implicitly.

While, with respect to FIG. 21, a scenario is illustrated where the control message 1603 is transmitted in response to initializing a new service, in other examples the control message 1603 can be transmitted in response to updating the duration 355 of the active period 305; hence, check 2022 is not mandatory. In still further examples, the control message 1603 may be transmitted piggy-backed on re-used RRC control signaling.

Summarizing, above techniques of monitoring a DTX rate of an initial PDCCH command sent during the active period of a DRX are disclosed. Where the DTX rate exceeds a certain threshold, the eNB automatically modifies the DRX; in particular, the active period of the DRX can be prolonged such that at least the next HARQ opportunity for retransmission of the initial PDCCH command is covered by the active period. Thereby, another chance of successfully transmitting the initial PDCCH command within a periodicity of the DRX is provided. The techniques may be in particular applied to conversational voice of VoLTE services.

E.g., the certain threshold used as a baseline for deciding when to prolong the duration of the active period may be dynamically tuned according to the needs, e.g., set differently for different services, terminals, or areas. In particular, by tuning the threshold—which may be seen to define the lowest accepted success rate of communicating the initial PDCCH command—it can be ensured that a modified DRX including a prolonged duration of the active period is effectively restricted to "trouble sites" where a degraded transmission quality on the radio link leads to an increased DTX rate. Thereby, the overall battery performance for terminals connected to the cellular network will be good and not degraded.

Different techniques of implementing the new active period of the DRX are disclosed. In one example, the new active period is implemented for upcoming DRX reconfiguration, hence avoiding additional RRC signaling. In further examples, the new active period is implemented for future VoLTE session. In some examples, the active period is implemented spatially resolved for certain areas, e.g., cells of the cellular network.

By such techniques of providing an additional opportunity of successfully communicating the PDCCH command, the voice quality of the VoLTE service may be improved. This may be due to the reduction of the delay. Further, VoLTE retainability may be improved, since signaling may use the legacy DRX profiles.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

E.g., while various examples have been given in the 3GPP LTE framework for a DRX, similar techniques may be readily applied for other kinds and types of discontinuous reception cycles.

E.g., while various examples have been given for commands communicated on an DL control channel such as the PDCCH, similar techniques may be readily applied for commands communicated on a UL control channel such as the PUCCH.

E.g., while various examples have been given for a VoLTE service, in other examples other kinds and types of services may be employed. E.g., the various examples disclosed herein may generally relate to a PS service. E.g., the various examples disclosed herein may relate to a bidirectional PS conversational video communication service. In particular, other kinds and type of services having the same or different QoS requirements regarding latency may be subject to the techniques disclosed herein. E.g., the various examples may be applied to bidirectional packetized media communication where media is conversational voice and/or conversational video.

The invention claimed is:

1. A method, comprising:

transmitting, via a radio link of a cellular network and to a terminal, a first message, the first message triggering the terminal to transmit a second message via the radio link at an associated transmission interval, monitoring the radio link for reception of the second message at the associated transmission interval, and based on said monitoring, determining a duration of an active period of a discontinuous reception cycle to be implemented by the terminal, wherein said determining of the duration of the active period of the discontinuous reception cycle comprises: selecting at least between a first duration of the active period and a second duration of the active period, wherein the first duration is shorter than a retransmission timer value of an Automatic Repeat Request protocol implemented by a Media Access Control layer utilized for transmission via the radio link, wherein the second duration is longer than the retransmission timer value.

2. The method of claim 1, wherein said monitoring of the radio link is for failed reception of the second message at the associated transmission interval.

3. The method of claim 1, wherein the first message specifies resources on a downlink payload channel utilized for transmission of downlink payload data via the radio link, wherein the second message comprises an indicator positively or negatively acknowledging reception of the downlink payload data transmitted in accordance with the first message.

4. The method of claim 3, wherein the second message is an acknowledgement message of an Automatic Repeat Request protocol implemented by a Media Access Control layer utilized for transmission via the radio link.

5. The method of claim 1, wherein the first message allocates resources on an uplink payload channel utilized for transmission of uplink payload data via the radio link, wherein the second message comprises the uplink payload data transmitted in accordance with the first message.

6. The method of claim 1, wherein the first message and the second message are associated with a service implemented by the cellular network and the terminal, the service having a quality of service requirement corresponding to a latency of at most 100 ms.

7. The method of claim 1, wherein the first message and the second message are associated with a service implemented by the cellular network and the terminal, the service being a bidirectional packet switched voice communication.

8. The method of claim 1, wherein the plurality of first messages and the second messages are associated with at least one service implemented by the cellular network and the terminal.

9. The method of claim 8, wherein the plurality of first messages and the second messages are all associated with a given service implemented by the cellular network and the terminal, wherein the method further comprises:
determining the threshold based on a quality of service requirement of the given service.

10. The method of claim 1,
wherein said determining of the duration of the active period of the discontinuous reception cycle comprises: selecting at least between a first duration of the active period and a second duration of the active period,
wherein the first duration is shorter than a multiple N of the retransmission timer value of an Automatic Repeat Request protocol implemented by a Media Access Control layer utilized for transmission via the radio link,
wherein the second duration is longer than the multiple N of the retransmission timer value.

11. The method of claim 1,
wherein the duration of the active period of the discontinuous reception cycle is determined for an area covered by the cellular network.

12. The method of claim 1,
wherein the duration of the active period of the discontinuous reception cycle is determined for a plurality of services implemented by the cellular network and the terminal.

13. The method of claim 1,
wherein a plurality of first messages is transmitted via the radio link to a plurality of terminals, each one of the plurality of first messages triggering a respective terminal to transmit a respective second message via the radio link at a respectively associated transmission interval,
wherein the radio link is monitored for reception of the second messages at the associated transmission intervals.

14. The method of claim 1, further comprising:
transmitting a control message to the terminal, the control message including an indicator indicating the duration of the active period of the discontinuous reception cycle and triggering the terminal to implement the duration of the active period of the discontinuous reception cycle.

15. The method of claim 14,
wherein the control message is transmitted in response to said determining of the duration of the active period of the discontinuous reception cycle or is transmitted in response to initializing a new service implemented by the cellular network and the terminal.

16. A method, comprising:
a network node transmitting, via a radio link of a cellular network and to a terminal, a first message, the first message triggering the terminal to transmit a second message via the radio link at an associated transmission interval,
the terminal, during an active period of a discontinuous reception cycle having a first duration, monitoring the radio link for reception of the first message,
the terminal, in response to receiving the first message, transmitting, via the radio link and to the network node the second message at the associated transmission interval,
the network node monitoring the radio link for reception of the second message at the associated transmission interval, and
based on said monitoring of the radio link for reception of the second message, determining a second duration of the active period of the discontinuous reception cycle to be implemented by the terminal,
wherein a plurality of first messages is transmitted via the radio link and to the terminal, each one of the plurality of first messages triggering the terminal to transmit a respective second message via the radio link at a respectively associated transmission interval,
wherein the radio link is monitored for reception of the second messages at the associated transmission intervals,
wherein the method further comprises:
based on said monitoring, determining at least one of a success rate and a failure rate of reception of the second messages,
executing a threshold comparison between a threshold and the at least one of the success rate and the failure rate,
wherein the duration of the active period of the discontinuous reception cycle is determined based on said executing of the threshold comparison.

17. A network node of a cellular network, comprising:
a memory configured to store instructions executable by at least one processor,
the at least one processor configured to execute the instructions to perform:
transmitting, via a radio link of the cellular network and to a terminal, a first message, the first message triggering the terminal to transmit a second message via the radio link at an associated transmission interval,
monitoring the radio link for reception of the second message at the associated transmission interval, and
based on said monitoring, determining a second duration of an active period of a discontinuous reception cycle to be implemented by the terminal,
wherein said determining of the duration of the active period of the discontinuous reception cycle comprises: selecting at least between a first duration of the active period and a second duration of the active period,
wherein the first duration is shorter than a retransmission timer value of an Automatic Repeat Request protocol implemented by a Media Access Control layer utilized for transmission via the radio link,
wherein the second duration is longer than the retransmission timer value.

18. A system, comprising:
a network node of a cellular network, the network node comprising a memory configured to store first instructions executable by at least one processor and the at least one processor,
a terminal, the terminal comprising a memory configured to store second instructions executable by at least one processor and the at least one processor,
wherein the at least one processor of the network node is configured to execute the first instructions to perform transmitting a first message via a radio link of the cellular network to the terminal, the first message triggering the terminal to transmit a second message via the radio link at an associated transmission interval,
wherein the at least one processor of the terminal is configured to execute the second instructions to perform monitoring the radio link for reception of the first message during an active period of a discontinuous reception cycle having a first duration and to perform transmitting the second message via the radio link at the associated transmission interval in response to receiving the first message, and
wherein the at least one processor of the network node is configured to execute the first instructions to further perform monitoring the radio link for reception of the second message at the associated transmission interval and, based on said monitoring of the radio link for reception of the second message, determining a second duration of the active period of the discontinuous reception cycle to be implemented by the terminal, wherein a plurality of first messages is transmitted via the radio link and to the terminal, each one of the plurality of first messages triggering the terminal to transmit a respective second message via the radio link at a respectively associated transmission interval, wherein the radio link is monitored for reception of the second messages at the associated transmission intervals, wherein the method further comprises:

based on said monitoring, determining at least one of a success rate and a failure rate of reception of the second messages, executing a threshold comparison between a threshold and the at least one of the success rate and the failure rate, wherein the duration of the active period of the discontinuous reception cycle is determined based on said executing of the threshold comparison.

* * * * *